US010603955B2

(12) United States Patent
Abramov et al.

(10) Patent No.: US 10,603,955 B2
(45) Date of Patent: Mar. 31, 2020

(54) FOLDABLE VEHICLE, SYSTEM AND ADJUSTMENT ASSEMBLY THEREOF FOR ADJUSTING WIDTH OF A VEHICLE

(71) Applicant: CITY TRANSFORMER LTD., Tel Aviv (IL)

(72) Inventors: Erez Abramov, Hagor (IL); Asaf Formoza, Tel Aviv (IL); Gideon Goldwine, Qiryat Tiv'on (IL)

(73) Assignee: CITY TRANSFORMER LTD., Tel-Aviv (IL)

( * ) Notice: Subject to any disclaimer, the term of this patent is extended or adjusted under 35 U.S.C. 154(b) by 118 days.

(21) Appl. No.: 15/518,237

(22) PCT Filed: Oct. 14, 2014

(86) PCT No.: PCT/IL2014/050899
§ 371 (c)(1),
(2) Date: Apr. 10, 2017

(87) PCT Pub. No.: WO2015/056266
PCT Pub. Date: Apr. 23, 2015

(65) Prior Publication Data
US 2017/0305190 A1 Oct. 26, 2017

Related U.S. Application Data

(60) Provisional application No. 61/890,560, filed on Oct. 14, 2013.

(51) Int. Cl.
*B60B 35/10* (2006.01)
*B60B 35/00* (2006.01)

(52) U.S. Cl.
CPC .......... *B60B 35/1036* (2013.01); *B60B 35/10* (2013.01); *B60B 35/1072* (2013.01); *B60B 35/00* (2013.01); *B60B 2900/114* (2013.01)

(58) Field of Classification Search
CPC . B60B 35/1036; B60B 35/10; B60B 35/1072; B60B 2900/114; B60B 35/00; B60B 35/109
See application file for complete search history.

(56) References Cited

U.S. PATENT DOCUMENTS 243,216 A * 6/1881 Conner ................. B60B 35/109
 280/638
3,782,491 A * 1/1974 Herbenar .............. B60B 35/003
 180/435

(Continued)

FOREIGN PATENT DOCUMENTS

CA 2284417 A1 3/2001
DE 19933052 C1 11/2000

(Continued)

*Primary Examiner* — Paul N Dickson
*Assistant Examiner* — Timothy Wilhelm
(74) *Attorney, Agent, or Firm* — Kenealy Vaidya LLP

(57) ABSTRACT

Some embodiments are directed to an adjustment assembly for changing width of a vehicle including at least one pair of wheels, where the adjustment assembly is embedded in the vehicle and is connectable to a pair of front, middle or rear wheels thereof. The adjustment assembly includes, inter alia: a foldable unit connectable to the pair of wheels of the vehicle, configured for changing its overall length over a predefined axis "Y" connecting the centers of the pair of wheels, for adjusting a distance between the pair of wheels it connects to; and a tilting unit operatively associated with the pair of wheels of the vehicle to which the foldable unit connects. The tilting unit is configured for changing angular positioning of the pair of wheels in respect to the "Y" axis, during driving of the vehicle when folded or unfolded.

15 Claims, 26 Drawing Sheets

(56) References Cited

U.S. PATENT DOCUMENTS

| | | | | |
|---|---|---|---|---|
| 3,820,615 A * | 6/1974 | Bobard | ............... | B60B 35/003 |
| | | | | 180/340 |
| 4,109,747 A * | 8/1978 | Hornagold | ............ | B60B 35/003 |
| | | | | 180/403 |
| 4,350,222 A | 9/1982 | Lutteke et al. | | |
| 5,489,114 A * | 2/1996 | Ward | ................. | B60B 35/1054 |
| | | | | 180/209 |
| 6,371,243 B1 | 4/2002 | Donaldson et al. | | |
| 6,827,176 B2 * | 12/2004 | Bean | .................... | B60B 35/003 |
| | | | | 180/411 |
| 7,216,896 B1 * | 5/2007 | McGhie | ................ | B62D 21/20 |
| | | | | 180/209 |
| 7,717,210 B2 * | 5/2010 | Mahy | ................... | A61G 5/046 |
| | | | | 180/209 |
| 7,780,197 B2 * | 8/2010 | White | .................... | B60G 9/02 |
| | | | | 280/781 |
| 7,832,741 B2 * | 11/2010 | Donaldson | ............ | B62D 49/08 |
| | | | | 180/209 |
| 7,954,583 B2 | 6/2011 | Coers et al. | | |
| 7,963,361 B2 * | 6/2011 | Coers | ..................... | A01D 41/12 |
| | | | | 180/403 |
| 8,746,388 B2 * | 6/2014 | Budweil | ............ | B60B 35/1063 |
| | | | | 180/209 |
| 9,205,881 B2 * | 12/2015 | Vandergon | ............. | B60G 99/00 |
| 9,434,412 B2 * | 9/2016 | Clark | .................... | B62D 7/1509 |
| 9,636,949 B2 * | 5/2017 | Jong | ....................... | F02B 77/11 |
| 9,930,821 B2 * | 4/2018 | Clifford | ............... | A01B 63/006 |
| 9,968,023 B2 * | 5/2018 | Brooks | ................ | A01B 63/026 |
| 2008/0190682 A1 | 8/2008 | Mahy et al. | | |
| 2009/0206567 A1 | 8/2009 | Donaldson | | |
| 2012/0029771 A1 | 2/2012 | Mackin et al. | | |
| 2013/0062133 A1 | 3/2013 | Budweil | | |

FOREIGN PATENT DOCUMENTS

| | | |
|---|---|---|
| EP | 2050423 A1 | 4/2009 |
| JP | S41-23050 Y | 11/1941 |
| JP | H04-43502 U | 4/1992 |
| JP | 2006-264510 A | 10/2006 |
| JP | 2013-212734 A | 10/2013 |
| WO | 05056308 A1 | 6/2005 |

* cited by examiner

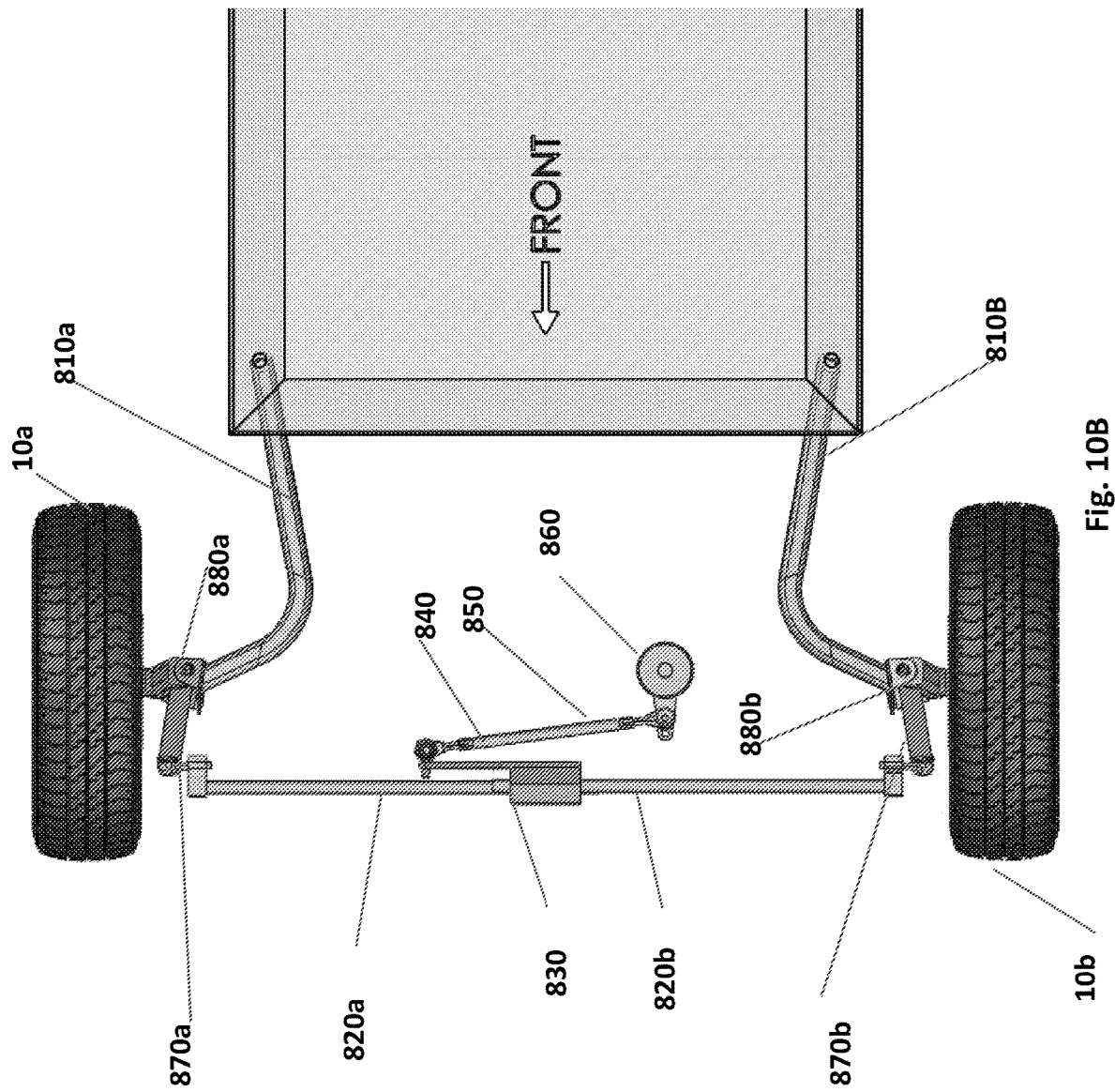

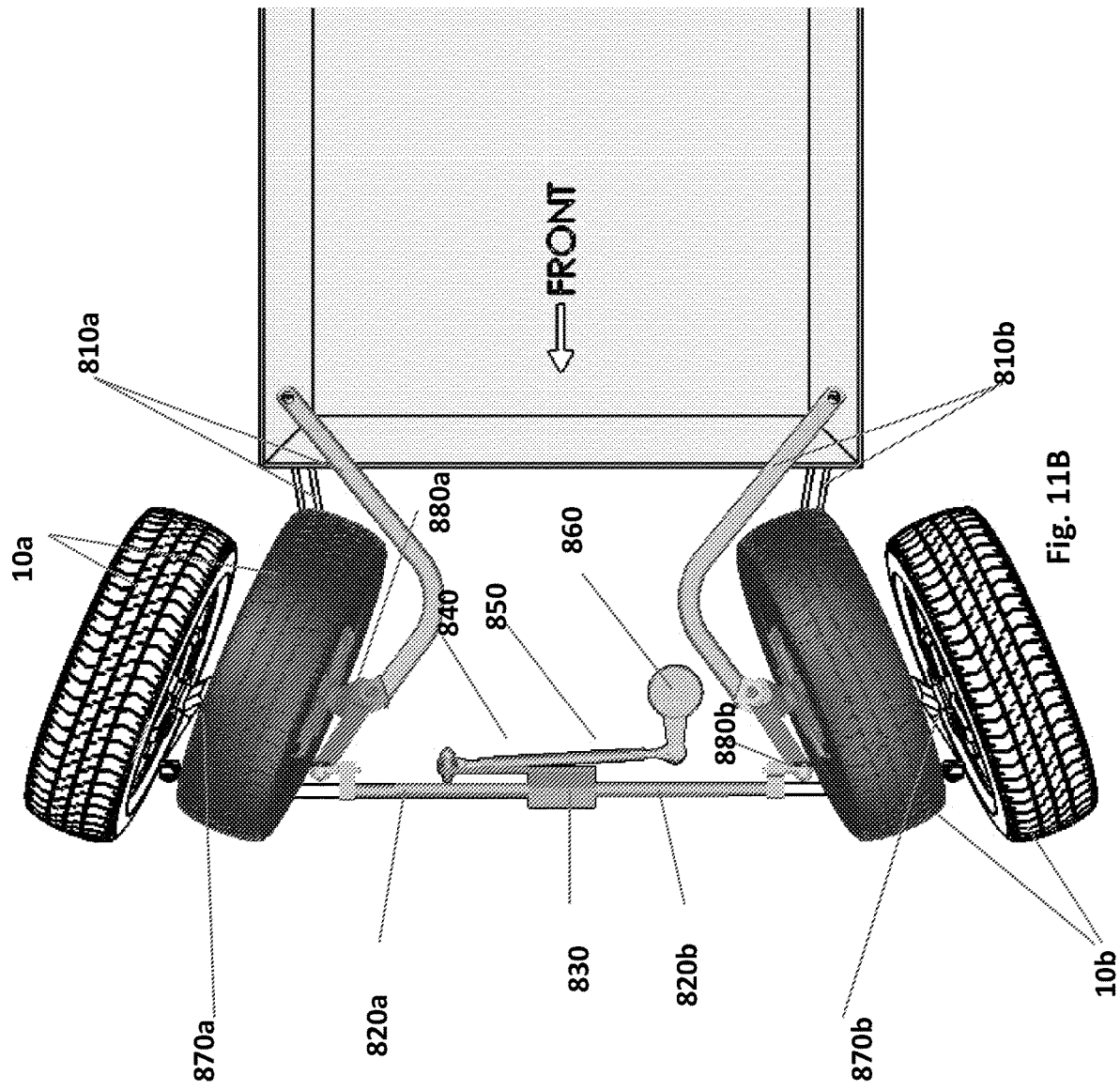

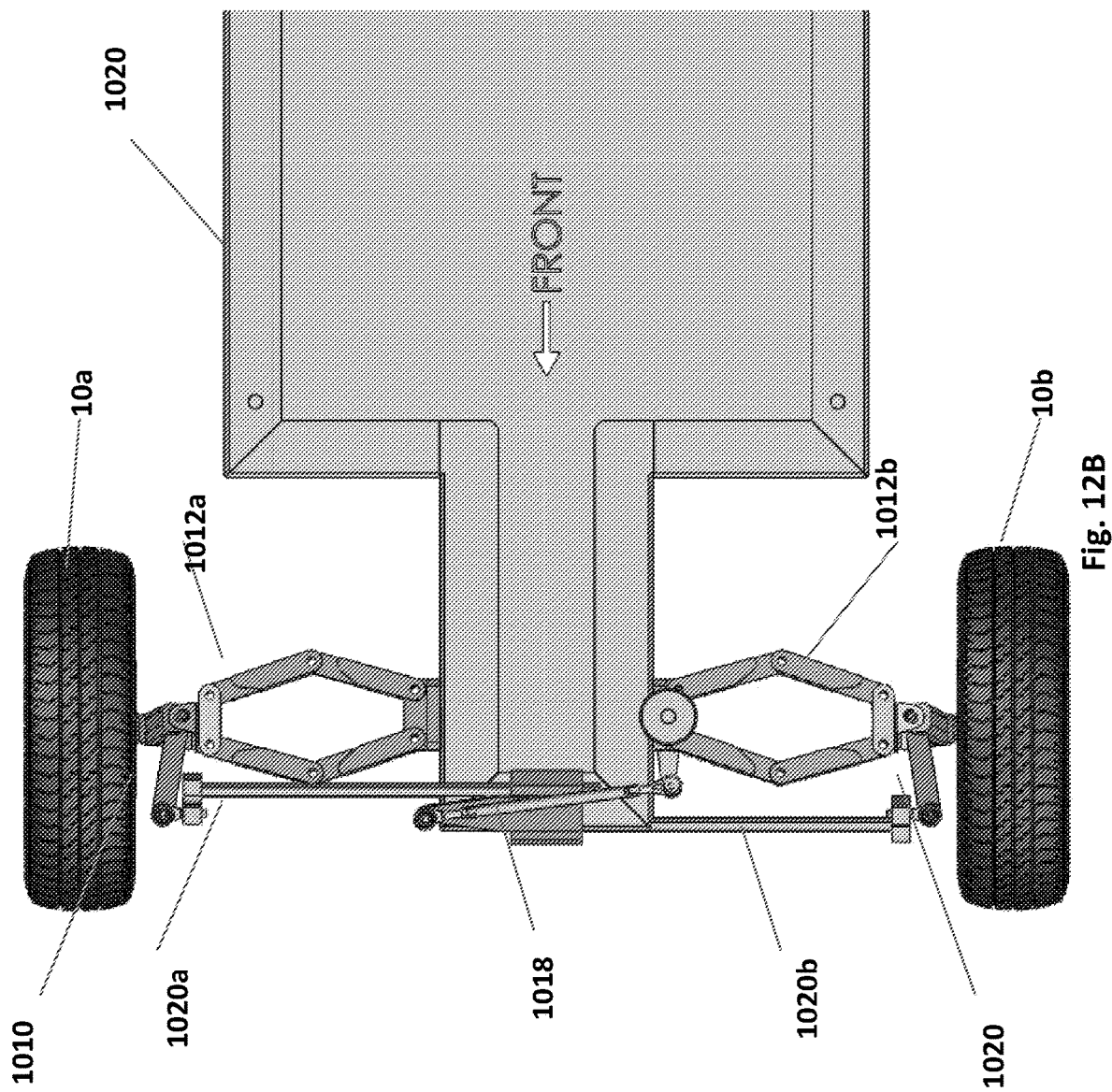

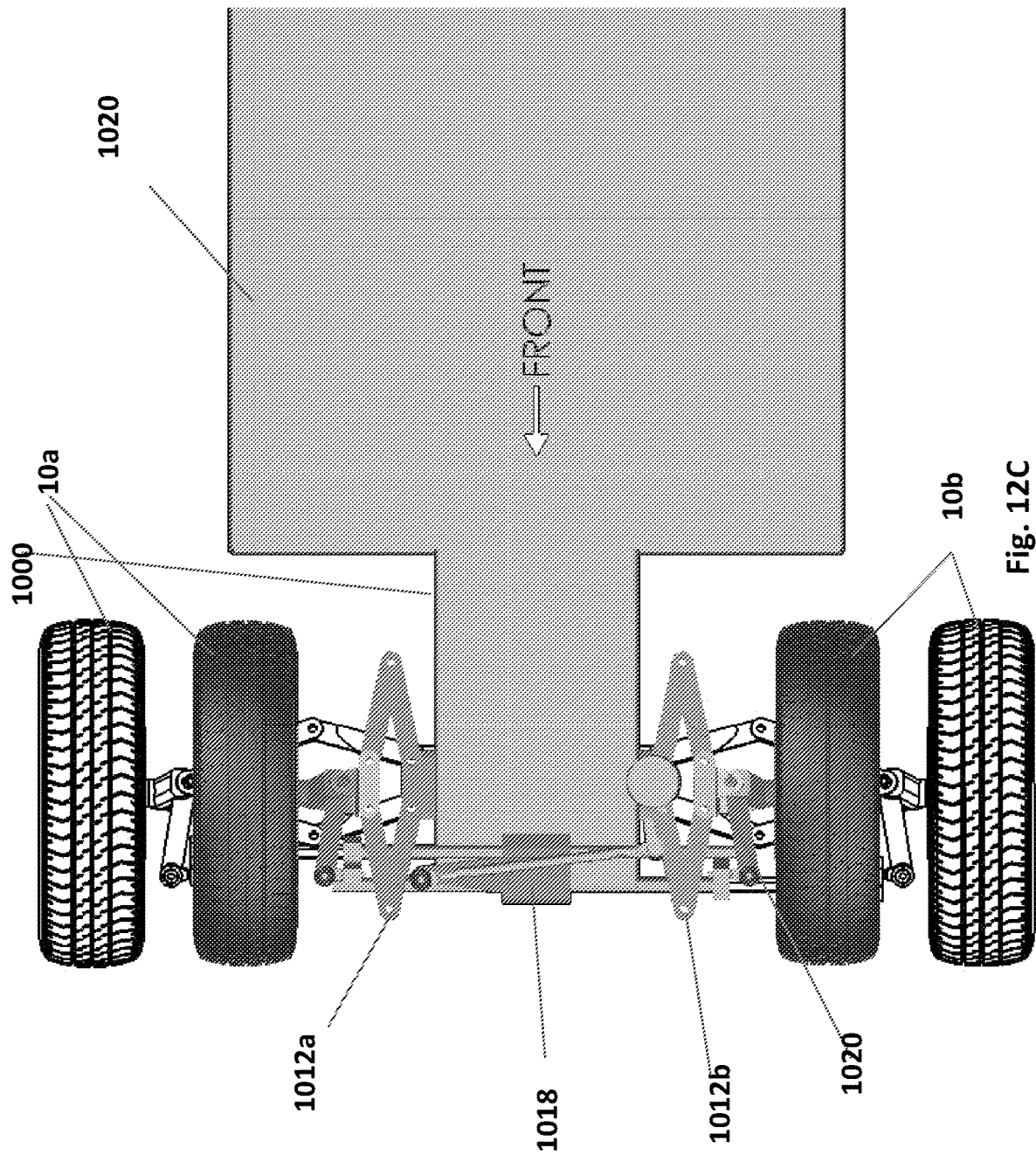

FOLDABLE VEHICLE, SYSTEM AND ADJUSTMENT ASSEMBLY THEREOF FOR ADJUSTING WIDTH OF A VEHICLE

CROSS REFERENCE TO RELATED APPLICATION

This application is a U.S. National Phase filing under 35 C.F.R. § 371 of, and claims priority to, International PCT Patent Application No.: PCT/IL2014/050899, filed on Oct. 14, 2014, the content of which is hereby incorporated in its entirety by reference.

FIELD OF THE INVENTION

The present invention generally relates to foldable/expandable vehicles and methods for folding and unfolding thereof and more particularly to width adjustment methods and systems and mechanisms for adjusting width of a vehicle.

BACKGROUND OF THE INVENTION

Foldable vehicles such as the HIRIKO™ foldable car (see link: http://www.youtube.com/watch?v=Qy3OgZYe1ZM), developed initially by MIT (Massachusetts Institute of Technology), are typically designed to save parking place and for easy maneuvering and parking in urban traffic. In the case of the HIRIKO™ foldable car, the folding mechanism is designed to adjust the length of the car almost by half (i.e. adjust the distance between the rear and front wheels) and optionally to also adjust its height. The length of the HIRIKO™ foldable car is adjusted by bringing the front wheels closer to the rear wheels closer together to fold the car into a folded position and farther from each other to bring the car to an unfolded position. The width of the HIRIKO™ foldable car however remains unchangeable. Since the HIRIKO™ foldable car has a small passenger(s) compartment fitting one driver passenger or more.

SUMMARY OF THE INVENTION

According to some embodiments of the invention, there is provided an adjustment assembly for changing width of a vehicle that has at least one pair of wheels, where the adjustment assembly is embedded in the vehicle and is connectable to a pair of front, middle or rear wheels thereof. The adjustment assembly includes, inter alia: (i) a foldable unit connectable to the pair of wheels of the vehicle, configured for changing its overall length along a predefined axis "Y" connecting the centers of the pair of wheels, for adjusting a distance between the pair of wheels it connects to; and (ii) a tilting unit operatively associated with the pair of wheels of the vehicle to which the foldable unit connects. The tilting unit is configured for changing angular positioning of the pair of wheels in respect to the "Y" axis, during driving of the vehicle when the vehicle is folding or unfolding.

According to some embodiments of the invention, there is provided an adjustment assembly for changing vertical size of a vehicle that has at least one pair of wheels, said adjustment assembly is embedded in said vehicle and is connectable to a pair of front, middle or rear wheels of the vehicle. The adjustment assembly comprising: an extendable/foldable unit connectable to the pair of wheels of the vehicle, said foldable unit is configured for changing its overall length along a predefined axis "Y" connecting the centers of the pair of wheels, for adjusting a distance between the pair of wheels it connects to and a tilting unit operatively associated with the pair of wheels of the vehicle to which the foldable unit connects, said tilting unit is configured for changing angular positioning of the pair of wheels in respect to the axis "Y", said tilting unit is controlled by a controller of the vehicle.

The folding/unfolding is preformed during driving of the vehicle wherein said tilting unit and/or said foldable unit is controllable via a controller for operating thereof.

According to some embodiments of the invention the change in the angular position maintain the motion track of the wheel along a pre-defined axis.

According to some embodiments of the invention the change in the angular position of all wheels is synchronized.

According to some embodiments of the invention the extendable foldable unit is comprised of: two adjustment assemblies, each connectable to a different pair of front and rear wheels, where the two adjustment assemblies are connect to one another for coordinating and synchronizing their operation via a connecting unit.

According to some embodiments of the invention the adjustment assembly is comprised of foldable unit, which are configured to move along Y axis inward and toward each other, there by changing the distance between pair of wheels.

According to some embodiments of the invention the foldable units include adjustable members having serrated portion and sloped portion, where the adjustment assemblies are engaged at the serrated portion by a gear, such that when the wheels are tilted and driven, the gear rotate and transmit torque thereof for causing lateral departing or converging of the adjustment members.

According to some embodiments of the invention the foldable units are interconnected telescopically.

According to some embodiments of the invention the foldable units are pentagon collapsing assemblies.

According to some embodiments of the invention the adjustment assembly is further comprising security folding bottom platforms which are folding and unfolding along with the wheels, wherein the platforms create continues area between each pair of wheels.

According to some embodiments of the invention the adjustment assembly is further comprising at least motor for actuating the tilting unit operation.

According to some embodiments of the invention, the adjustment assembly is further comprising at least one motor for supporting the operation of the folding assemblies.

According to some embodiments of the invention the movable adjustment members movement is restricted from folding or unfolding via safety stoppers, wherein the movement restriction is controlled according to predefined rules.

According to some embodiments of the invention the tilting unit 120 includes two telescopic members each including a piston, coaxially inserted and movable in cylinders.

According to some embodiments of the invention the tilting unit is mechanically connected directly to the wheels.

According to some embodiments of the invention the steering mechanism of the wheels which function at the normal driving mode, is mechanically connected directly to the wheels.

According to some embodiments of the invention the telescopic members are actuated via an actuator connected to at least one engine of the vehicle for pulling and pushing the pistons inside their respective cylinder.

According to some embodiments of the invention the tilting units are controlled and operated by or through the controller by electronically simultaneously controlling the movements of their pistons for changing angular positioning of the wheels.

According to some embodiments of the invention the gear functions as a sensor for sensing and indicating of the positioning and width of the vehicle at each given moment, by having a mechanism associated therewith counting the pitch angle and reporting the sensed width to the controller for enabling to control the tilting units according to the sensed current width.

According to some embodiments of the invention both the tilting units and the foldable units are actuated simultaneously via the controller using different or the same actuators for actuating each type of unit.

According to some embodiments of the invention the controller automatically executes a safety procedure of predefined rules, before starting the folding process including at least one of the following rules: (i) speed limit validation and control, ensures that the vehicle is driven within a predefined range of speeds either (ii) steering angle limit validation and control, ensuring that the steering wheel angle does not exceed a predefined limit.

According to some embodiments of the invention the adjustment assembly further comprising sensing means for measuring distance between the wheels in each pair in real time during the folding process or unfolding process, the measurements are received and processed at the controller.

According to some embodiments of the invention the wheels are tilted gradually during the folding process or unfolding process.

According to some embodiments of the invention the wheels are tilted when the vehicle is not in motion.

According to some embodiments of the invention the wheels are remain at the same titling angle during the folding process.

According to some embodiments of the invention the distance between each pair of wheels is sensed only at the starting point of the folding process and at the end of the process.

BRIEF DESCRIPTION OF THE DRAWINGS

FIG. 4A shows an isometric view of the system in the converged and folded position; FIG. 4B shows a top view of the system in the converged and folded position; and FIG. 4C shows a front view of the system in the converged and folded position.

FIG. 5A shows an isometric view of the system in the converged and unfolded position; FIG. 5B shows a top view of the system in the converged and unfolded position; and FIG. 5C shows a front view of the system in the converged and unfolded position.

FIG. 6A shows an isometric view of the system in the non-converged and unfolded position; FIG. 6B shows a top view of the system in the non-converged and unfolded position; and FIG. 6C shows a front view of the system in the non-converged and unfolded position.

FIG. 7A shows an isometric view of the system in the non-converged and folded position; FIG. 7B shows a top view of the system in the non-converged and folded position; and FIG. 7C shows a front view of the system in the non-converged and folded position.

FIGS. 10A-10B show an optional configuration of the system folding/extending mechanism, according to some embodiments of the invention: FIG. 10A shows top view of folding/extendable mechanism in folded position; FIG. 10B shows a top view of folding/extending mechanism in the unfolded position;

FIGS. 11A-11B show the alternative configuration of the system folding/extending mechanism (as shown in FIGS. 10A-10B) at different tilting positions, according to some embodiments of the invention: FIG. 11A shows top view of folding/extending mechanism in folded (dark wheels) and unfolded (light wheels) positions and the wheels at strait position;

FIG. 11B shows top view of folding/extending mechanism in folded (the wheels are shown is dark color) and unfolded (the wheels are shown in light color) positions and the wheels at tilted position.

FIGS. 12A-12C show an alternative configuration of the system folding/extending mechanism, according to some embodiments of the invention: FIG. 12A shows top view of folding/collapsing mechanism in folded position; FIG. 12B shows a top view of folding/collapsing mechanism in the unfolded position;

FIG. 12C shows a top view of folding/collapsing mechanism in different folding position, folded (the wheels are shown in dark color) and unfolded (the wheels are shown in light color) positions FIG. 13A shows top view of the system bottom structure in folded position; FIG. 13B shows a top view of the system bottom structure in the unfolded position;

DETAILED DESCRIPTION OF SOME EMBODIMENTS OF THE INVENTION

Figure 1:
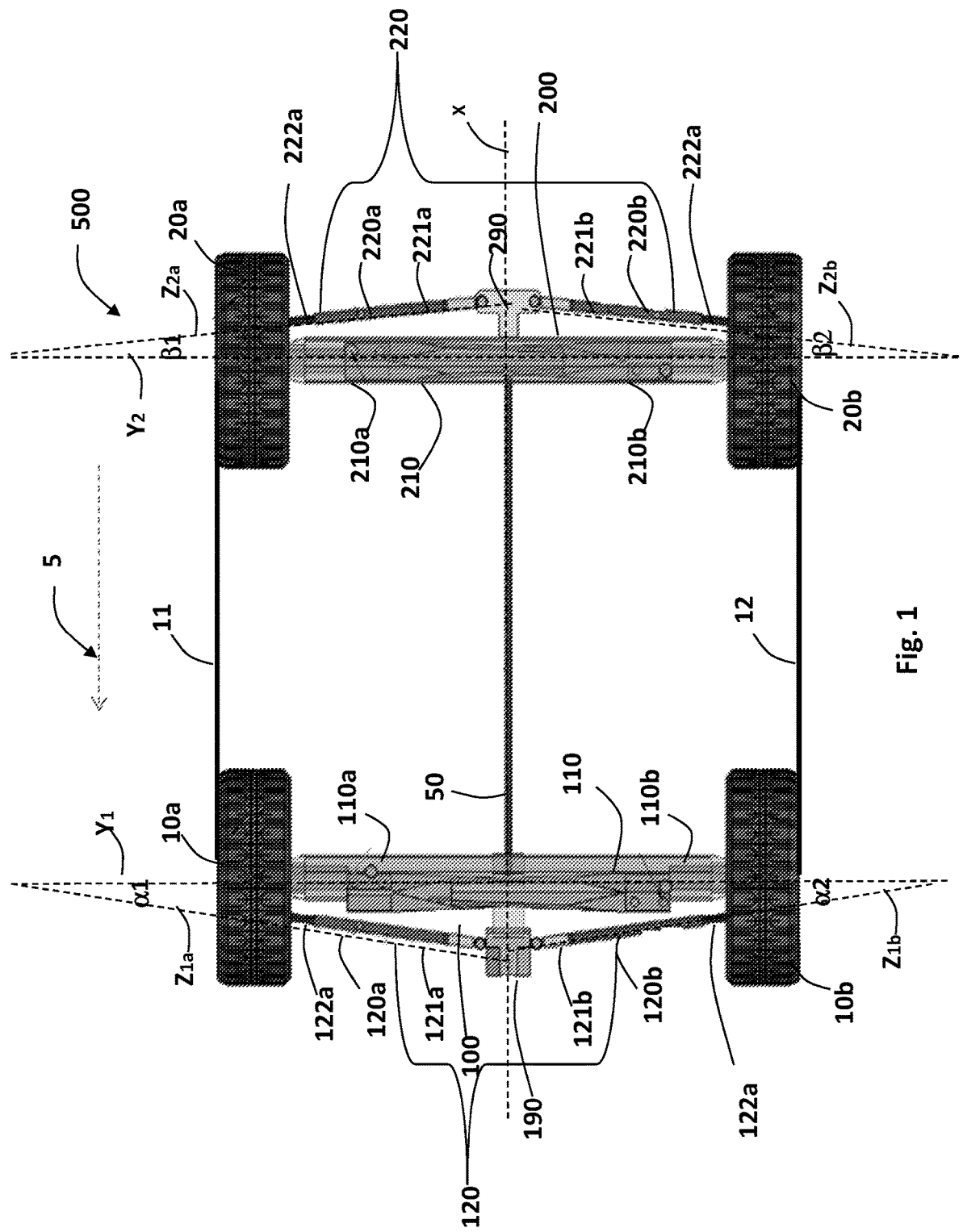
FIG. 1 shows a top view of a system for adjusting width of a foldable vehicle, wherein the system includes, inter alia, two adjustment assemblies operatively connected to one another, configured for changing the width of the vehicle, according to some embodiments of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides systems methods and mechanisms such as adjustment assemblies for adjusting width of a vehicle as well as providing a foldable vehicle having a system including one or more of these mechanisms embedded therein as part of the vehicle itself. The foldable vehicle is designed to fold by decreasing width thereof, i.e. distance between each pair of rear and front for taking up fewer parking spaces and/or for easier maneuvering through urban narrow roads.

The system includes one or more adjustment assemblies each is a mechanical mechanism that connects to a pair of front/rear/middle wheels of a foldable vehicle for enabling this vehicle to be folded and unfolded for changing its overall width, where the system is embedded in the foldable vehicle as integral part thereof.

According to some embodiments, the adjustment assembly connects to a pair of wheels (e.g. front or rear wheels) of the vehicle and includes: (i) a foldable unit connectable to the pair wheels of the vehicle, which is configured for adjusting its overall width, for changing a distance between the pair of wheels it connects to over an axis "Y" between the centers of the wheels; and (ii) a tilting unit operatively associated with the pair of wheels of the vehicle to which the foldable unit connects, wherein the tilting unit is configured for tilting of a single wheel or a pair of wheels (i.e. changing the angular positioning in respect to the "Y" axis) during driving of the vehicle when folded or unfolded.

The adjustment assembly is configured such that once the driver orders to fold or unfold the vehicle (depending on its condition at the time) the tilting unit and/or the foldable unit is automatically operated while the vehicle is driven in a limited speed for folding or unfolding thereof in a smooth and comfortable manner, by having the wheels gradually tilted during the slow drive (during the folding process) to one or more desired angular positions in respect to the "Y" axis and the foldable unit fold/unfold in coordination with the tilting of the wheels. Optionally, the tilting operation may be performed when the vehicle is not moving, before starting the folding process.

Optionally, the wheels are not tilted gradually, but are remain at the same titling angle during the folding process.

The tilting unit may include extendible elements that are angularly positioning in respect to the "Y" axis, where each element may connect to a different wheel of the pair. Each extendible element (such as a telescopic member that can be folded and unfolded to change its length) connects to a separate rear/front wheel, such that once these extendible elements are actuated to extend or fold thereof, they cause the front/rear wheels to tilt to a predefined angular positioning while the vehicle (and the wheels thereof) is driven allowing the width to be changed gradually and smoothly during the drive due to the tilt of the wheels.

The titling unit may be implemented, partly as an inner unit integrated with in the wheel, optionally using an engine.

The titling unit may be implemented, by mechanical mechanism directly controlling the tilting on the wheels. Alternatively the titling unit may be implemented, by electrical mechanism, using remote controller.

According to some embodiments, the foldable unit includes one or more foldable members that are laterally connected to the pair of wheels over the "Y" axis thereof, such that when the vehicle is driven and the pair of wheels are tilted by the tilting unit, these one or more members will automatically extend or shorten and thereby allow stabilized extension or shortening of the vehicle's width.

Since mechanisms such as these can be connected to the rear and front wheels of a vehicle they can be used to adjust the width of the vehicle rather than its length (i.e. adjusting the distance between the most distal edges of the right and left sides of the vehicle rather than the distance between the most distal edges of the front and back sides of the vehicle).

According to some embodiments, the system for adjusting the width of a vehicle includes multiple adjustment assemblies: one adjustment assembly for each pair of front and rear wheels (optionally in case of a longer vehicle other middle pairs of wheels are added each may connect to a corresponding adjustment assembly).

According to some embodiments, the operation of all the adjustment assemblies of the system are controlled by a single centralized controller and can be coordinated and/or synchronized via one or more mechanical and/or electronic means. This means that the pairs of wheels can be brought closer to or farther from one another via their corresponding adjustment assemblies in a synchronized manner in which all are moved simultaneously at the same rate and in a coordinated manner.

According to some embodiments of the invention, the length of the foldable unit of each adjustment assembly can be mechanically adjusted by for instance including one or more adjustment members such as a telescopic element or by laterally moving several elements from or to each other along the "Y" axis having parts thereof engaging and/or overlapping to enable changing the overall distance between one non-engaging edge of one member to another having these edges directly or indirectly connect to each of the pair of wheels for changing the distance therebetween by their movement. The laterally moving of the adjustment members along the "Y" axis can be controlled and carried out via a mechanical transmission mechanism controlled by the controller of the system. For example, each of two adjustment members includes a serrated portion that can be laterally moved by engaging a central gear (cog wheel), the wheel can be rotated by the controller using the battery of the vehicle as a power source and the vehicle's engine to actuate a drive shaft connecting to the gear for rotating thereof. Each adjustment member connects to the gear in an opposite manner such that a rotation of the same gear will cause opposite lateral movement of the adjustment members along the "Y" axis. In this way the rotation of the gear to one direction (e.g. counterclockwise) will cause the adjustment members to distance from each other and to the other direction (e.g. clockwise) to approach one another and thereby to increase and decrease their length and the distance between the wheels they connect to, respectively. This mechanical transmission mechanism using a gear for moving the adjustment members, is optional and any other transmission mechanism can be used.

Additionally or alternatively, the tilting unit includes multiple telescopic members each directly or indirectly connecting to a different wheel at one end thereof such that the axis of each telescopic member can be angularly changed in respect to the "Y" axis. In this way, whenever the distance between the two wheels (e.g. rear or front) is adjusted by the foldable unit (e.g. via rotation of a gear actuating thereof) the span of each of the telescopic members is changed thereby simultaneously changing the tilting angle of the wheels by pulling or pushing them inwardly or outwardly causing them to tilt thereby.

Reference is now made to FIGS. 1, 4A-4B, 5A-5B, 6A-6B and 7A-7B, schematically illustrating a system 500 for adjusting width of a vehicle in which the system 500 is embedded, according to some embodiments of the invention. This system 500 is adapted to a novel four-wheel vehicle having a pair of front wheels 10a and 10b and a pair of rear wheels 20a and 20b. The system 500 is configured for being installed as a base unit of the vehicle over which a compartment for one or more passengers (including the driver) can be seated and carried.

Figure 2:
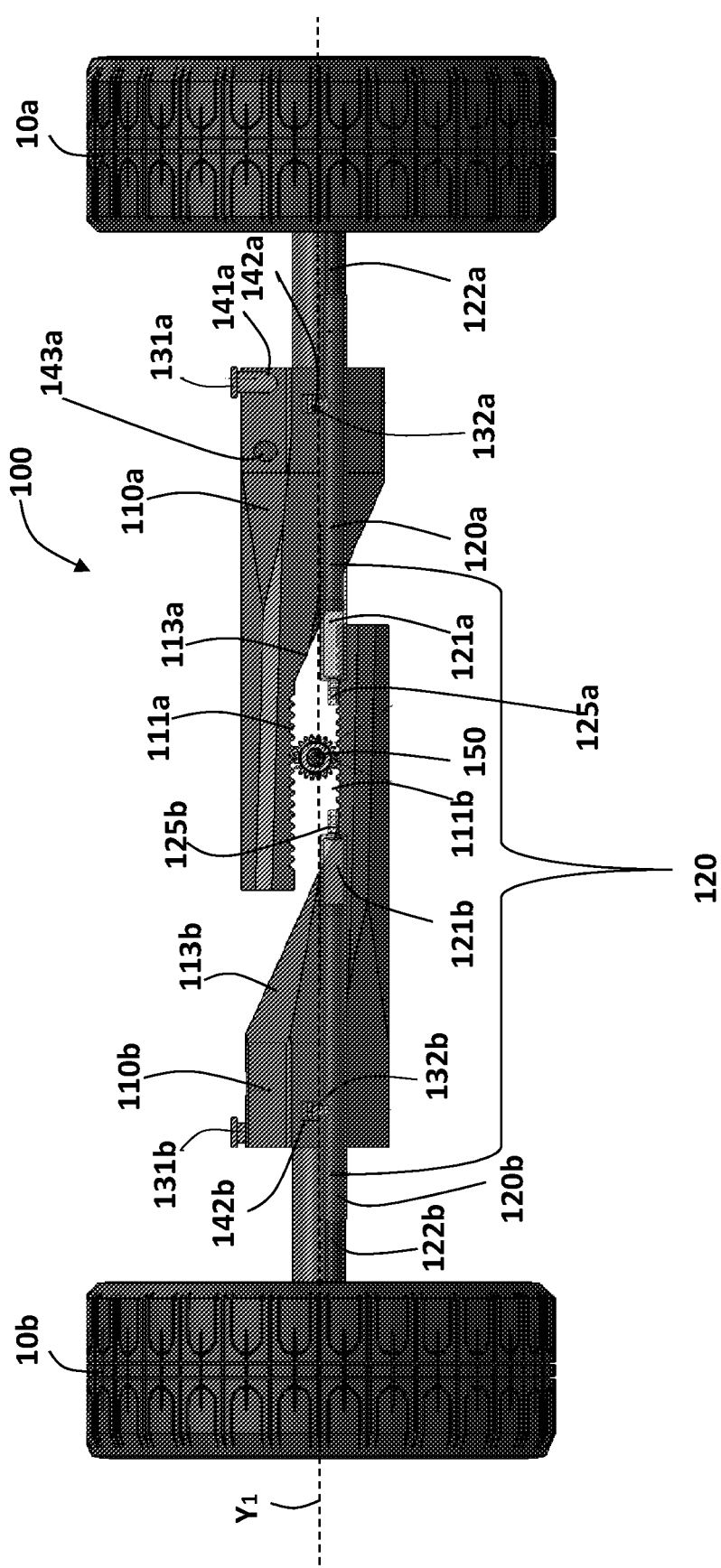
FIG. 2 shows a front view of one of the adjustment assemblies of the system of the vehicle, according to some embodiments of the present invention.
Figure 3:
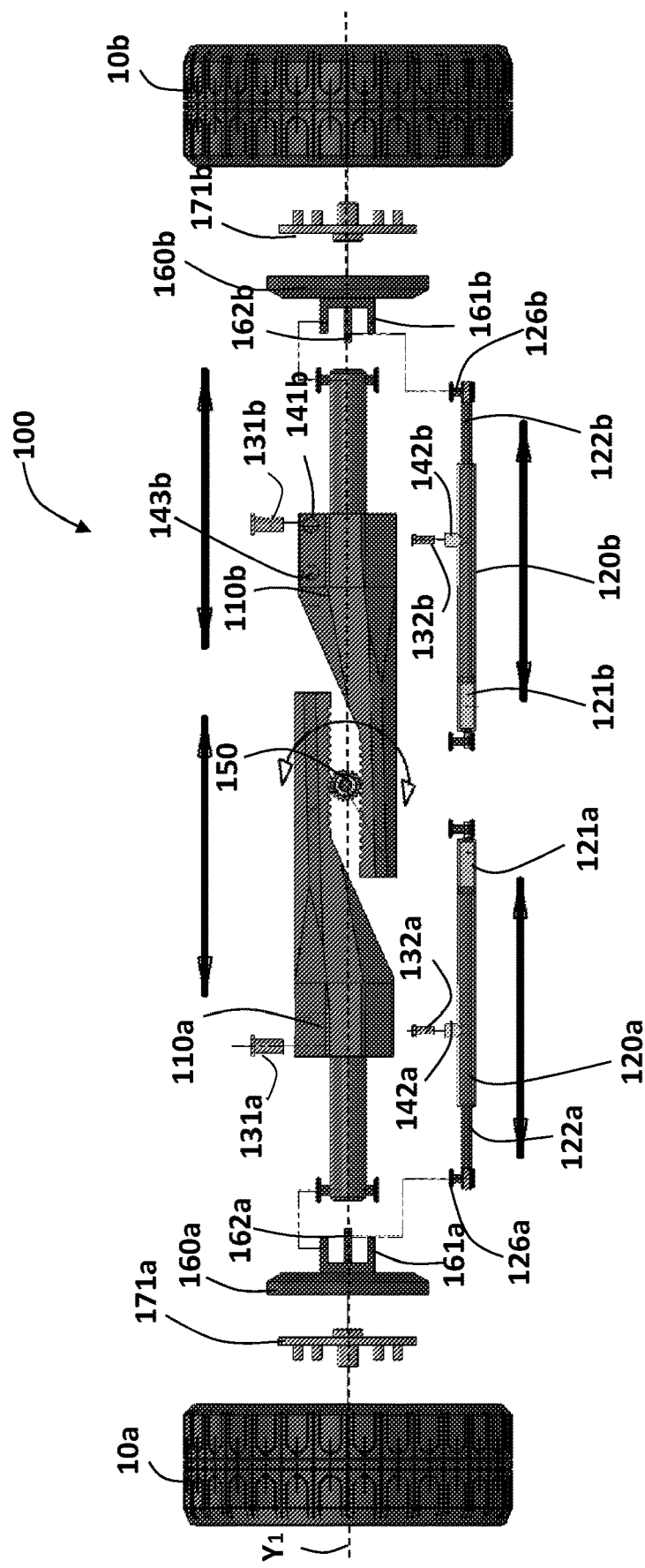
FIG. 3 shows an exploded view of one of the adjustment assemblies of the system, according to some embodiments of the present invention.

The system 500 includes two adjustment assemblies: a first adjustment assembly 100 and a second adjustment assembly 200 each connectable to a different pair of front and rear wheels 10a-10b and 20a-20b, respectively. The two adjustment assemblies 100 and 200 connect to one another for coordinating and synchronizing their operation via a connecting unit 50, which may be controlled by a controller 300 (see FIGS. 4A, 5A, 6A and 7A). The coordinating of the two adjustment assemblies is optional each unit may be controlled separately As illustrated in FIGS. 1-7C, each adjustment assembly 100 and 200 includes a foldable unit 110 and 210 and a tilting unit 120a and 120b or 220a and 220b, each unit connectable to the wheels 10a-10b and 20a-20b of the vehicle, respectively. FIGS. 2-3 show the first adjustment assembly 100 in details, although the second adjustment assembly 200 includes identical or similar components associated in the same or similar manner.

The arrow 5 in all figures indicates the movement of forward direction.

According to some embodiments, the foldable unit 110 of the first adjustment assembly 100 includes two adjustment members 110a and 110b which are movable elements each having a serrated portion 111a and 111b and a sloped portion 113a and 113b, respectively. The serrated portions 111a and 111b engage a cogwheel gear 150 (shortly referred to as gear 150) ensuring smooth transmission of movement to them by having the opposite lateral movement of the adjustment members 110a and 110b along the "Y" axis when the wheels are tilted and driven causing thereby the gear 150 to rotate and transmit torque thereof for causing lateral departing or converging of the adjustment members 110a and 110b.

As illustrated in FIGS. 2-3, the movable adjustment members 110a and 110b can be prevented from folding or unfolding via safety stoppers 131a and 131b, which in this example are protrusions configured for being inserted to corresponding recesses 141a, 143a on one, and corresponding recesses on the other side (not shown) for stopper 131b where each adjustment member 110a/110b has two recesses each for locking the adjustment members 110a/110b in a different folded or unfolded position.

Figure 5A:
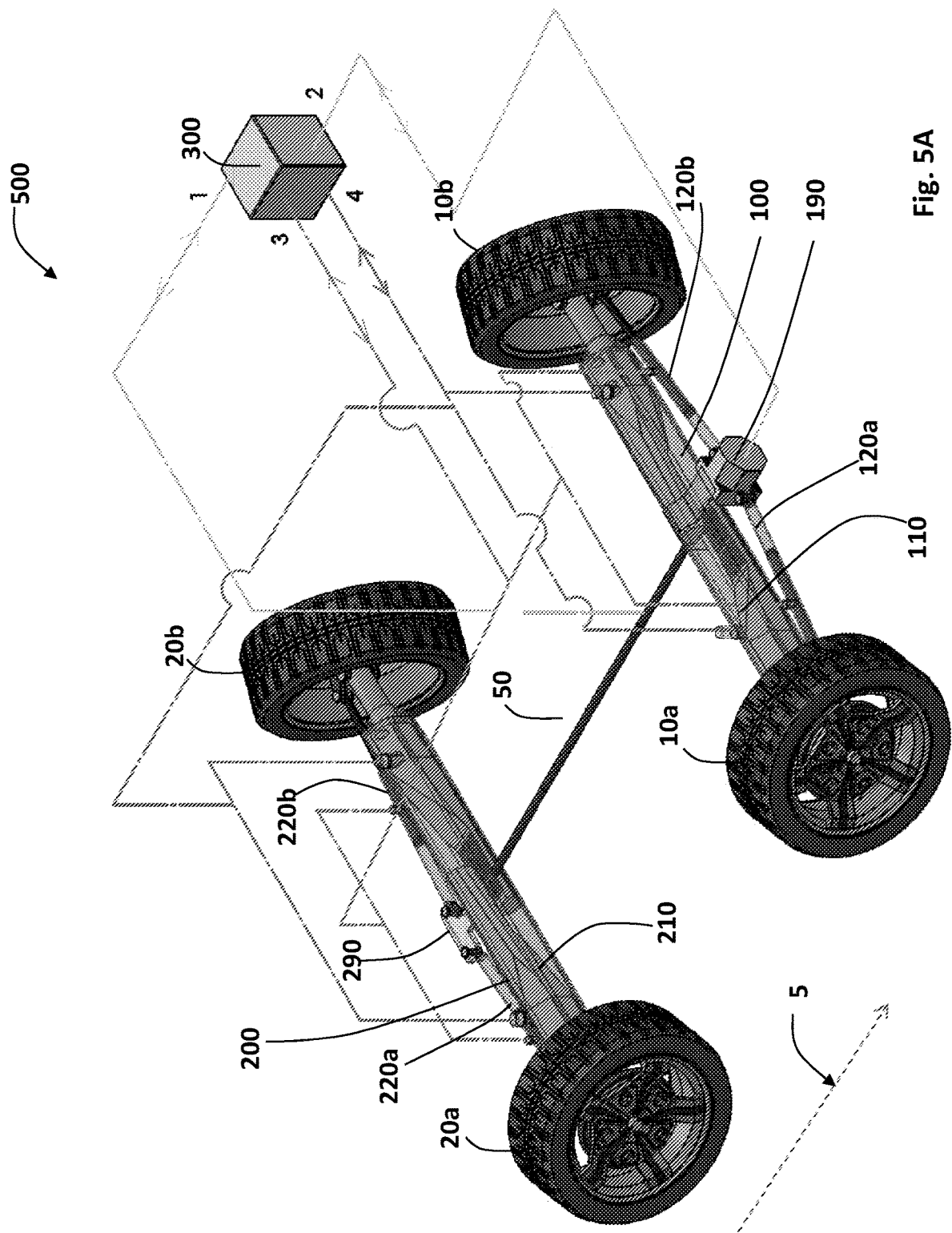
FIGS. 5A-5C show the system in a converged and unfolded position, in which the rear and front wheels of the vehicle are in a convergence titling positioning and the system is still in an unfolded position ready for folding thereof, having its safety stoppers unlocked, according to some embodiments of the invention.
Figure 5B:
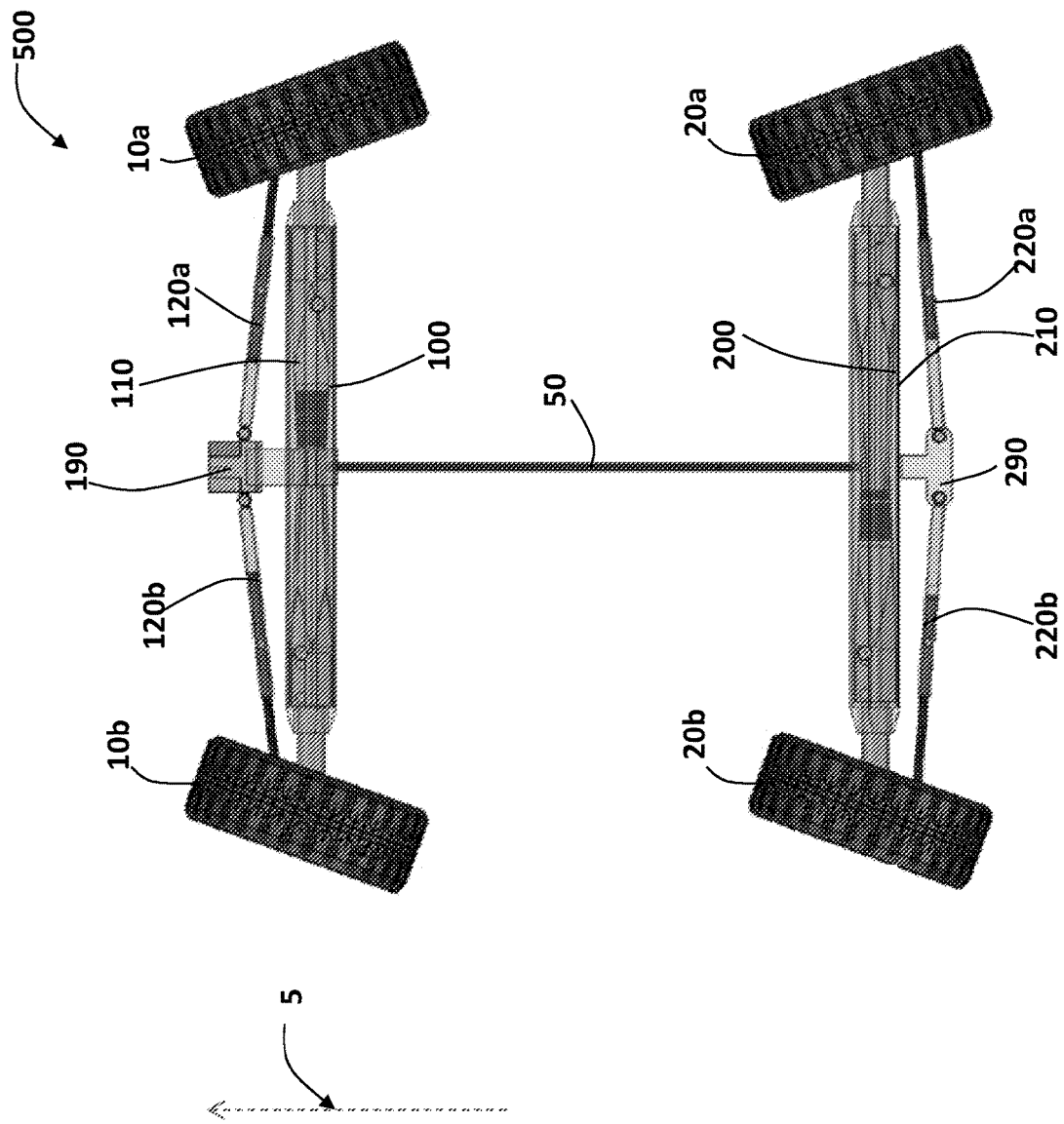
Figure 5C:
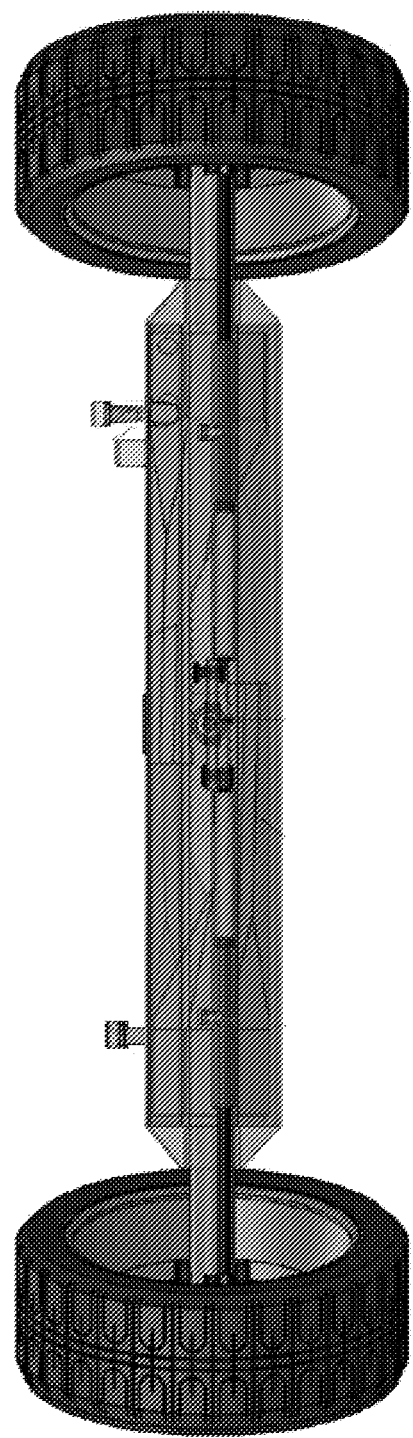
Figure 6A:
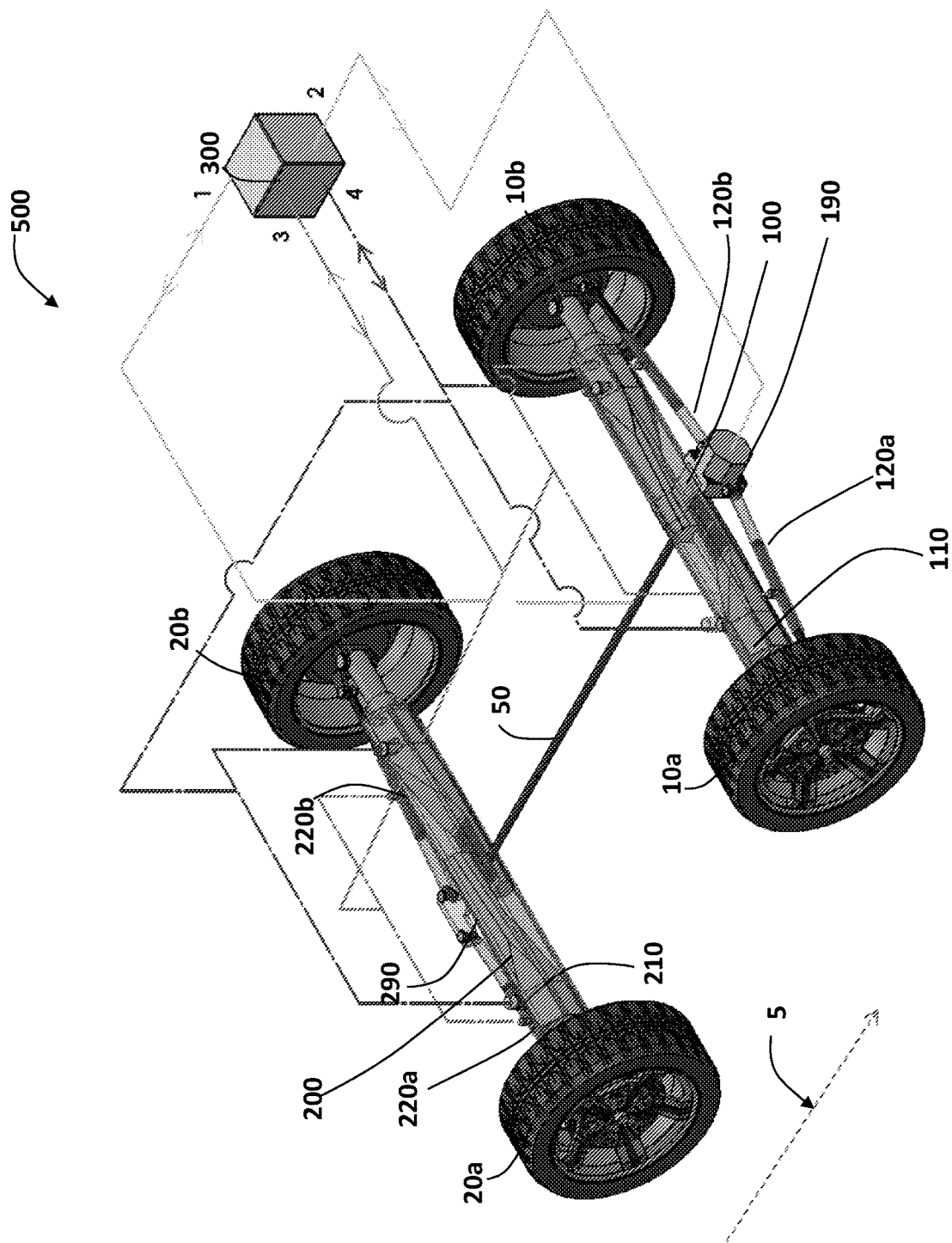
FIGS. 6A-6C show the system in a non-converged and unfolded position, in which the rear and front wheels of the vehicle are in a non-convergence titling positioning and the system is in an unfolded position ready for driving or after unfolding thereof, having its safety stoppers locked according to some embodiments of the invention.
Figure 6B:
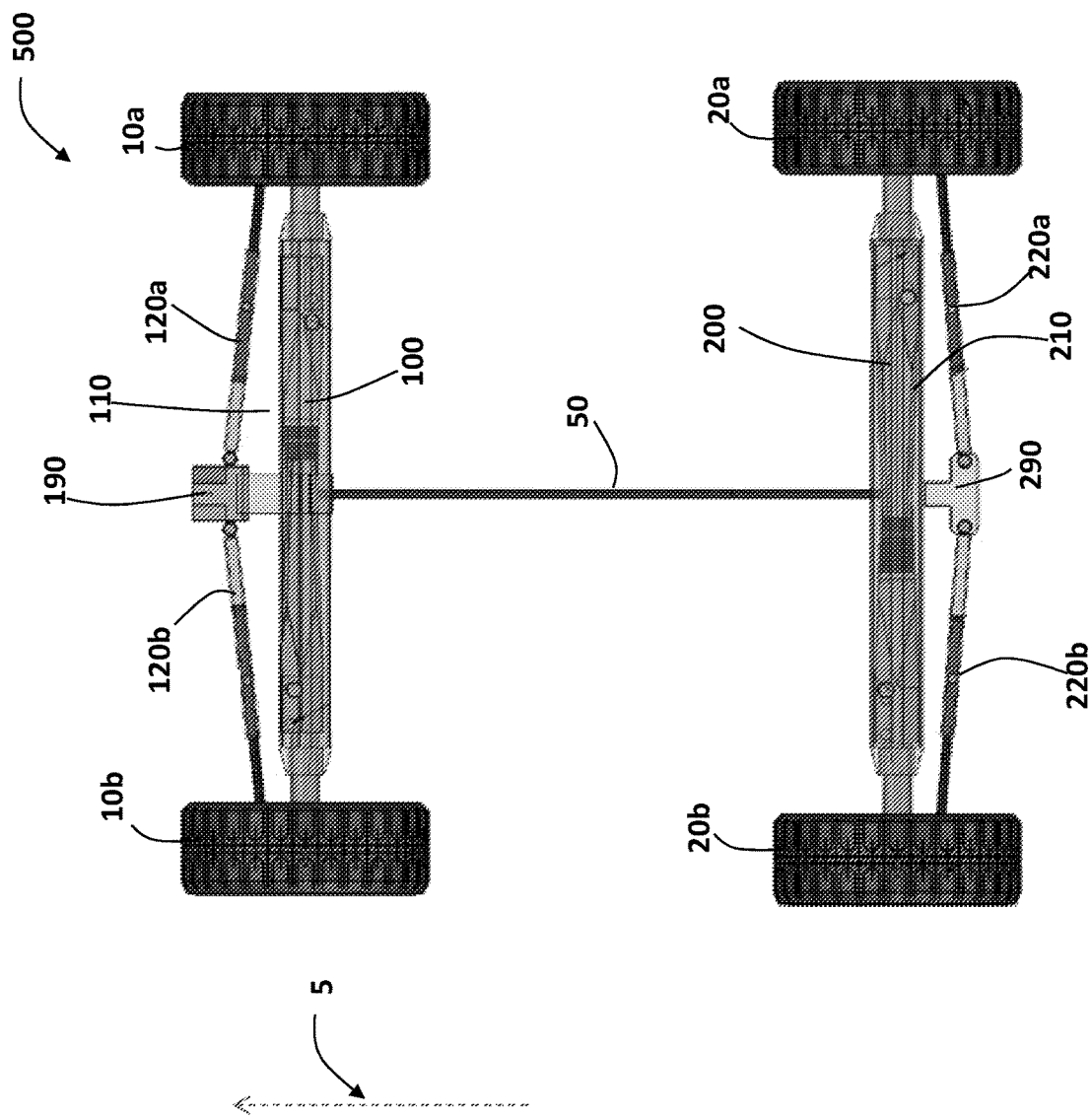
Figure 6C:
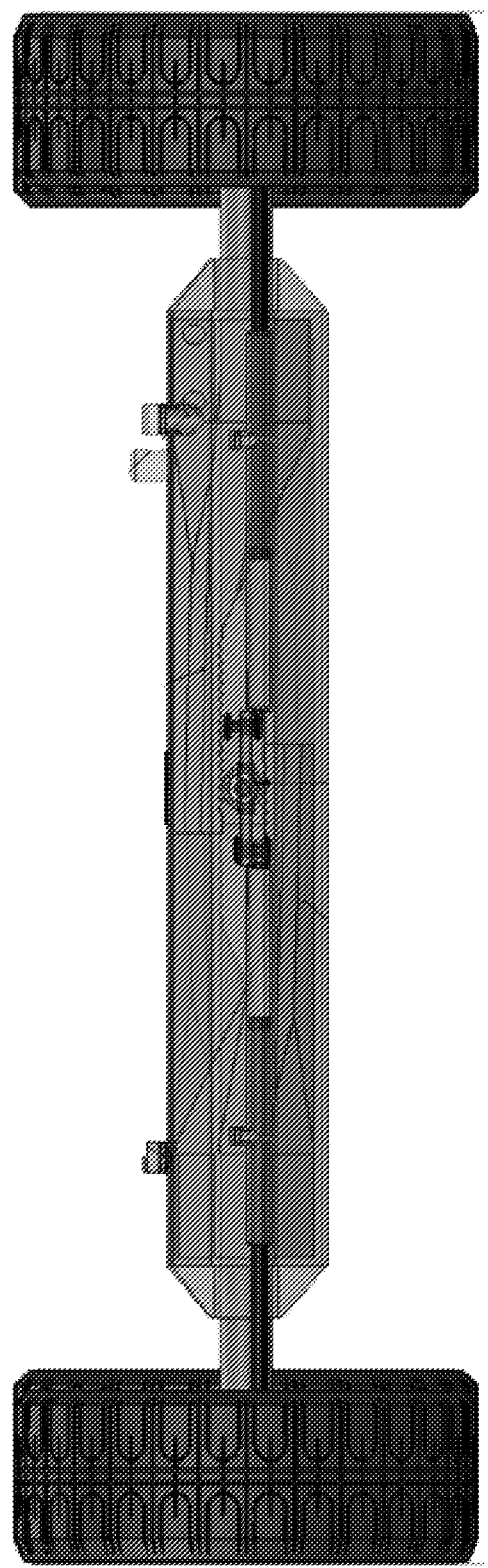

Once the driver wishes to cause the vehicle to fold for instance for parking thereof or for driving narrow roads or navigate through heavy traffic, he/she may input a signal which will be received at a controller 300 of the system 500 causing the safety locks to be released while verifying that the vehicle is driven in low-speed which may be limited by a predefined speed range. The unlocking of the safety stoppers (e.g. stoppers 131a and 131b) while driving the vehicle will automatically and naturally cause the two adjustment members 110a and 110b and 210a and 210b of the front and rear wheels 10a-10b and 20a-20b, respectively, to laterally move along their respective "Y1" and "Y2" axes, while having the tilting units 120 and 220 causing the pairs of wheels 10a and 10b and 20a and 20b to tilt inwardly as shown in FIGS. 5A-5B for instance for having them converge into a folded distance therebetween for reducing the width of the vehicle. The driving of the vehicle (in a limited low-speed) in a converging angular positioning will automatically cause the released adjustment members 110a and 110b to move towards one another having the gear 150 enabling their lateral movement, causing thereby the entire vehicle to fold by reducing/shortening width thereof.

Once the vehicle is folded, the protrusion stoppers 131a and 131b may be inserted into the other recesses of the adjustment members 110a and 110b and 210a and 210b.

It is clear to see in FIGS. 2-3 that a counterclockwise rotation of the gear 150 will be caused when the adjustment members 110a and 110b move away from one another along the "Y" axis, causing thereby increasing of the distance between the wheels 10a and 10b connected thereto. A clockwise rotation of the gear 150 is caused when the adjustment members 110a and 110b move towards one another along the "Y" axis, causing thereby decreasing of the distance between the wheels 10a and 10b connected thereto.

As illustrated in details in FIGS. 2-3, the tilting unit 120 includes two telescopic members 120a and 120b each including a piston 122a and 122b, respectively coaxially inserted and movable in cylinders 121a and 121b. Each of the telescopic members 120a and 120b connects to a different wheel such as to wheels 10a and 10b, respectively, at one end thereof and to a connecting element such as a steering joint 190 (if connected to the front wheels 10a and 10b for instance) or a standard rear joint or connector 290 (if connected to the rear wheels 20a and 20b for instance). The steering joint 190 may be implemented as part of the vehicle steering mechanism or as separate unit for coordinating between the back and the front folding units or tilting units. The coordination between the front and the back unit is optional. The connection between each telescopic member 120a/120b or 220a/220b and the respective wheel 10a/10b or 20a/20b is via one or more connections such as through a protrusion connector 126a/126b configured for being inserted through an opening or recess of a corresponding wheel connecting plate 160a/160b. Each of the connecting plates 160a and 160b connects to wheels 10a and 10b respectively, via a connector 171a and 171b. In other embodiments non-mechanical mechanisms may be used for folding and unfolding the foldable unit and/or for coordinating the folding and unfolding of several adjustment assemblies of the system.

According to some embodiments of the present invention, the steering mechanism of the wheels which function at the normal driving mode, is mechanically connected directly to the wheels.

As shown in FIG. 3, each connecting plate 160a and 160b includes several connecting elements 161a, 162a, 161b and 162b each having an opening therein wherein a first connecting element 161a and 161b is located off-center to the center of the wheel 10a and 10b axis "Y1", where an edge of each telescopic member such as 120a and 120b connects to a different first connecting element 161a and 161b respectively. This off-center connection allows the angular tilting of the wheels 10a and 10b caused by changing the length of the telescopic elements 120a and 120b angularly connecting thereto. Second connecting elements 162a and 162b are coaxial with "Y1" and connect to the edges of the adjustment members 110a and 110b for allowing these members to pull the wheels 10a and 10b towards each other along the "Y1" axis for decreasing distance therebetween and push the wheels 10a and 10b away from each other along the "Y1" axis for increasing distance therebetween.

The connection between each telescopic member 120a/120b or 220a/220b and the respective wheel 10a/10b or 20a/20b is such that the angle between an axis of each telescopic member 120a/120b such as axes Z1a, Z1b, Z2a and Z2b and the wheels central axes Y1 and Y2 respectively: α1 and α2 is non-zero. In this example α1=α2 and β1=α2 and optionally α1=α2=β1=β2 at each given moment. Optionally the α1 and α2 may not be similar. The telescopic members 120a and 120b and 220a and 220b may be actuated via an actuator connected to the engine or battery of the vehicle for instance for pulling and pushing the pistons inside their respective cylinders.

The tilting units 120 and 220 of the system 500 are controlled and operated by or through the controller 300 by, for example, electronically controlling the movements of their pistons for changing angular positioning of the wheels 10a-10b and 20a-20b.

According to some embodiments, the tilting units 120 and 220 are actuated via one or more actuators, e.g. via the same motor actuator powered by a separate battery or via the vehicle's battery or any other energy source.

According to some embodiments, the gear 150 can be used as a sensor for allowing sensing and indicating of the positioning and width of the vehicle at each given moment, by having a mechanism associated therewith counting the pitch angle (i.e. the number of rotations and angular positioning of the gear in respect to a predefined position thereover) and reporting the sensed width to the controller 300 of the system 500 for enabling to control the tilting units 120 and 220 according to the sensed current width.

According to some embodiments, the system 500 and vehicle it is installed in are configured such that to fold and unfold the system 500 the driver or any other passenger is required to instruct an initiation of a folding/unfolding process via an interface of the controller 300 for instance via an initiation button. Once the controller 300 receives the initiation signal for folding the vehicle (e.g. for parking) it initially executes a safety procedure in which it verifies and/or causes the vehicle to drive within a limited speed range that is non-zero but slow enough to have the wheels tilted easily for adjusting the width. Another function executed in this preliminary safety procedure, is releasing of the safety stoppers. These verifications and operations are carried out and controlled via the controller 300. Once the safety procedure is verified and done, the controller 300 operates the tilting units 120 and 220 of the system 500 during slow drive of the vehicle forward and optionally backward, depending on the desired driving direction and system 500 definitions. Optionally the tilting can be performed before releasing safety stoppers or at the same time. The tilting optionally done gradually as the vehicle is driven and therefore there is less resistance of the wheels (due to friction between the wheels and the road), as each pair of front and rear wheels 10a-10b and 20a-20b is tilted in opposite angular directions to converge for folding the vehicle or to diverge for unfolding thereof. The titling of the wheels 10a-10b and 20a-20b during the slow drive will cause, as mentioned above, the adjustment members 110a and 110b to move laterally in opposite directions away from or towards each other for respectively increasing or reducing the distance between each pair of wheels 10a-10b and 20a-20b. At the end of the width adjustment the controller 300 will cause the safety stoppers to lock for securing the fully folded/unfolded position.

According to some embodiments, as illustrated in FIGS. 2-3, the adjustment assembly 100 also includes safety stoppers 132a and 132b for locking the telescopic members 120a and 120b respectively in the fully unfolded and optionally also in the folded positions by being configured for being inserted into corresponding one or more recesses such as recesses 142a and 142b of the telescopic members 120a and 120b.

In alternative embodiment the gear 150 can be optionally rotated by the vehicle's engine or a separate motor to support or cause the operation of the folding or unfolding.

Figure 4A:
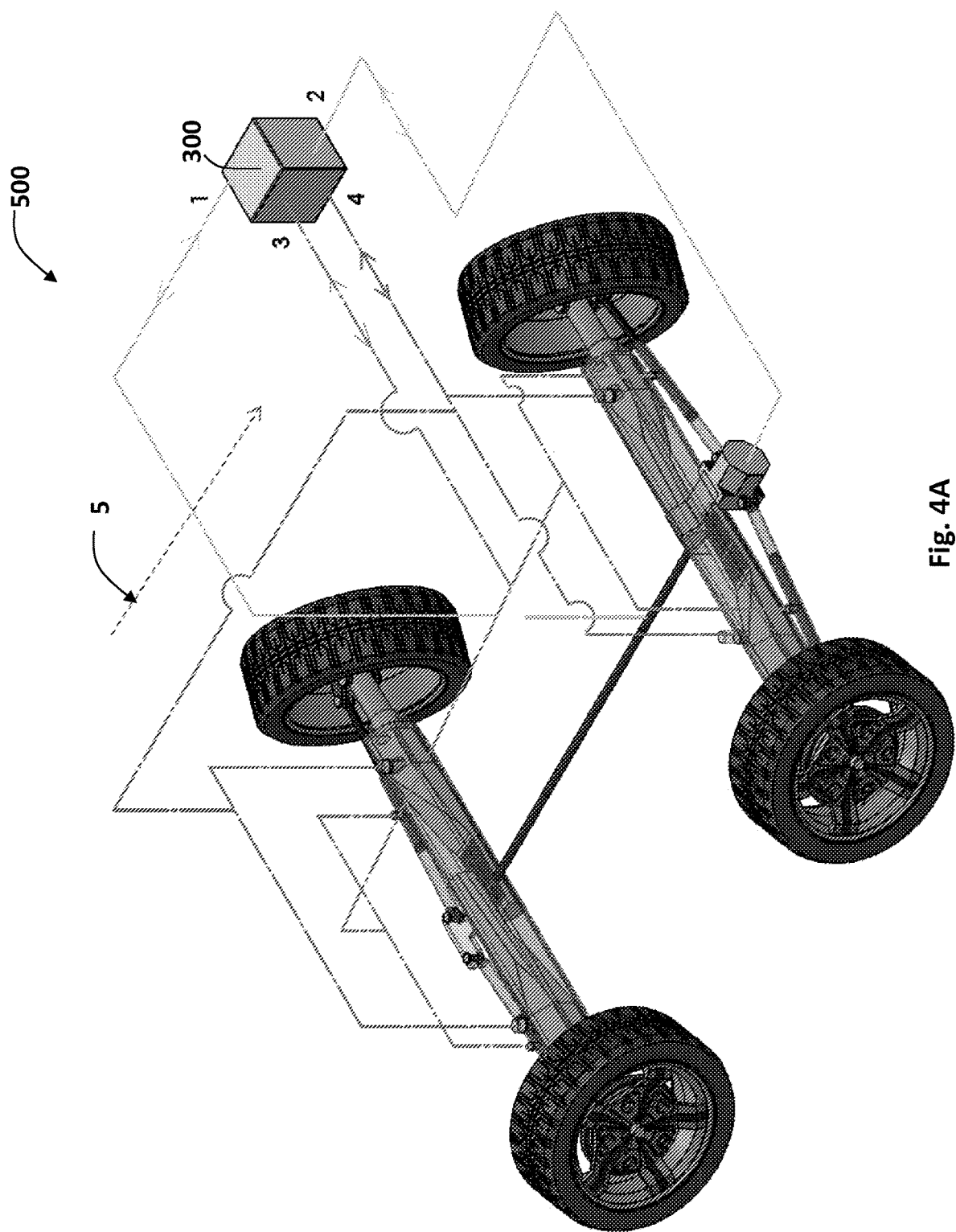
FIGS. 4A-4C show the system in a converged and folded position, in which the rear and front wheels of the vehicle are in a convergence titling positioning and the system is in its maximal folded position ready for opening thereof, having its safety stoppers unlocked, according to some embodiments of the invention.
Figure 4B:
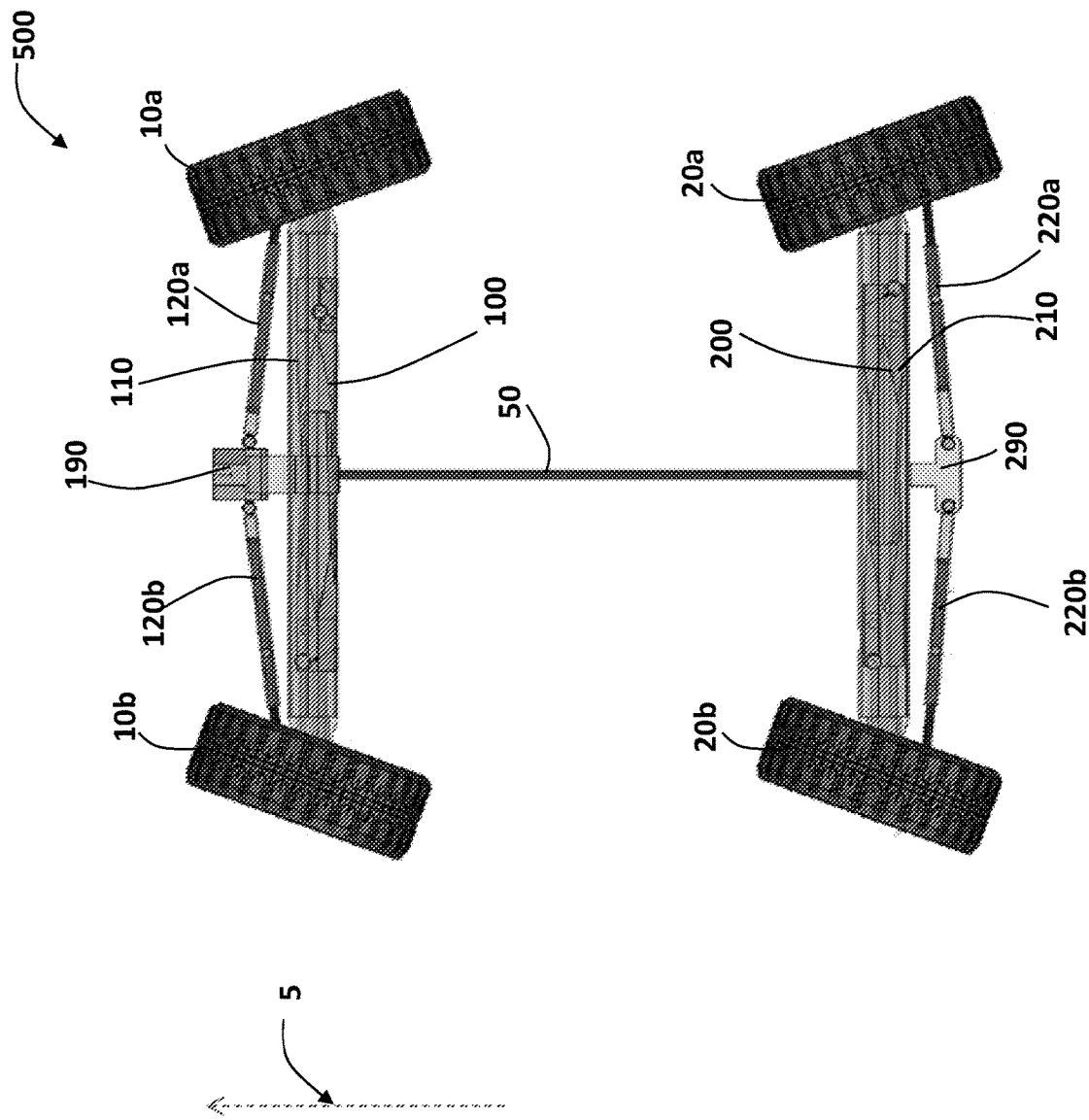
Figure 4C:
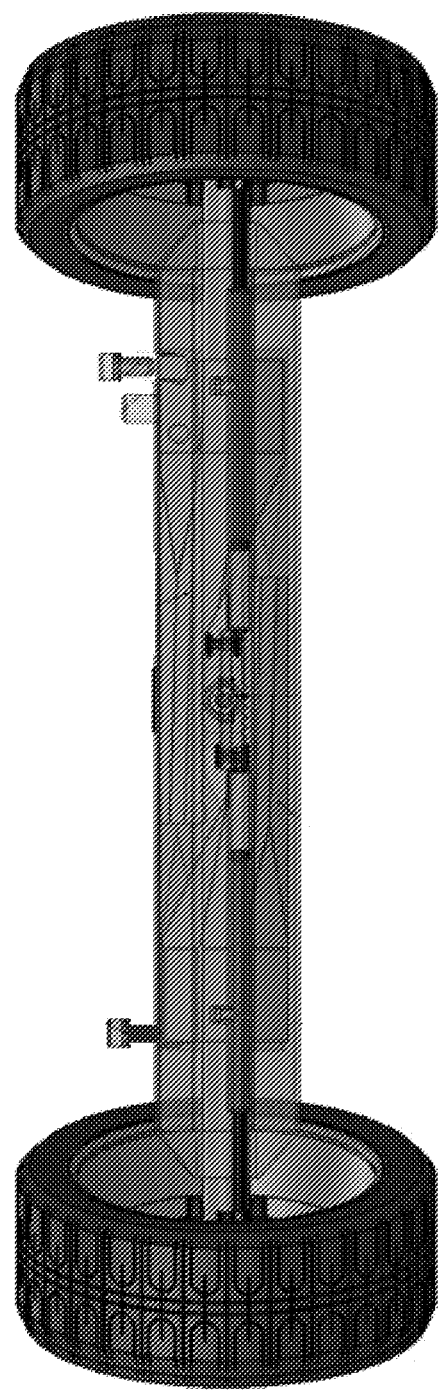
Figure 7A:
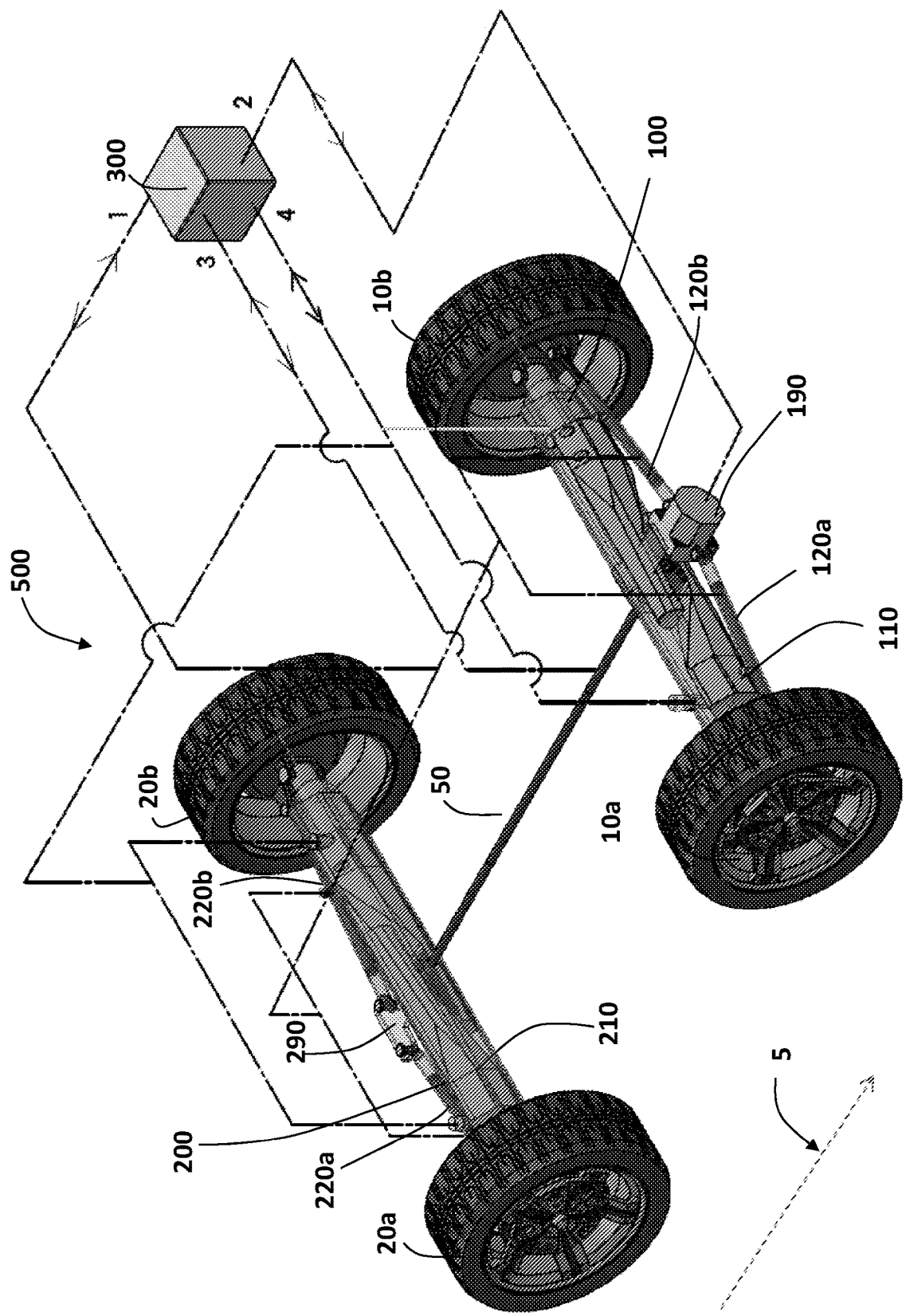
FIGS. 7A-7C show the system in a non-converged and folded/constrict position, of the rear and front vehicle wheels are in a non-convergence titling positioning and the system is in a folded position ready for parking mode or after folding thereof, having its safety stoppers locked, according to some embodiments of the invention.
Figure 7B:
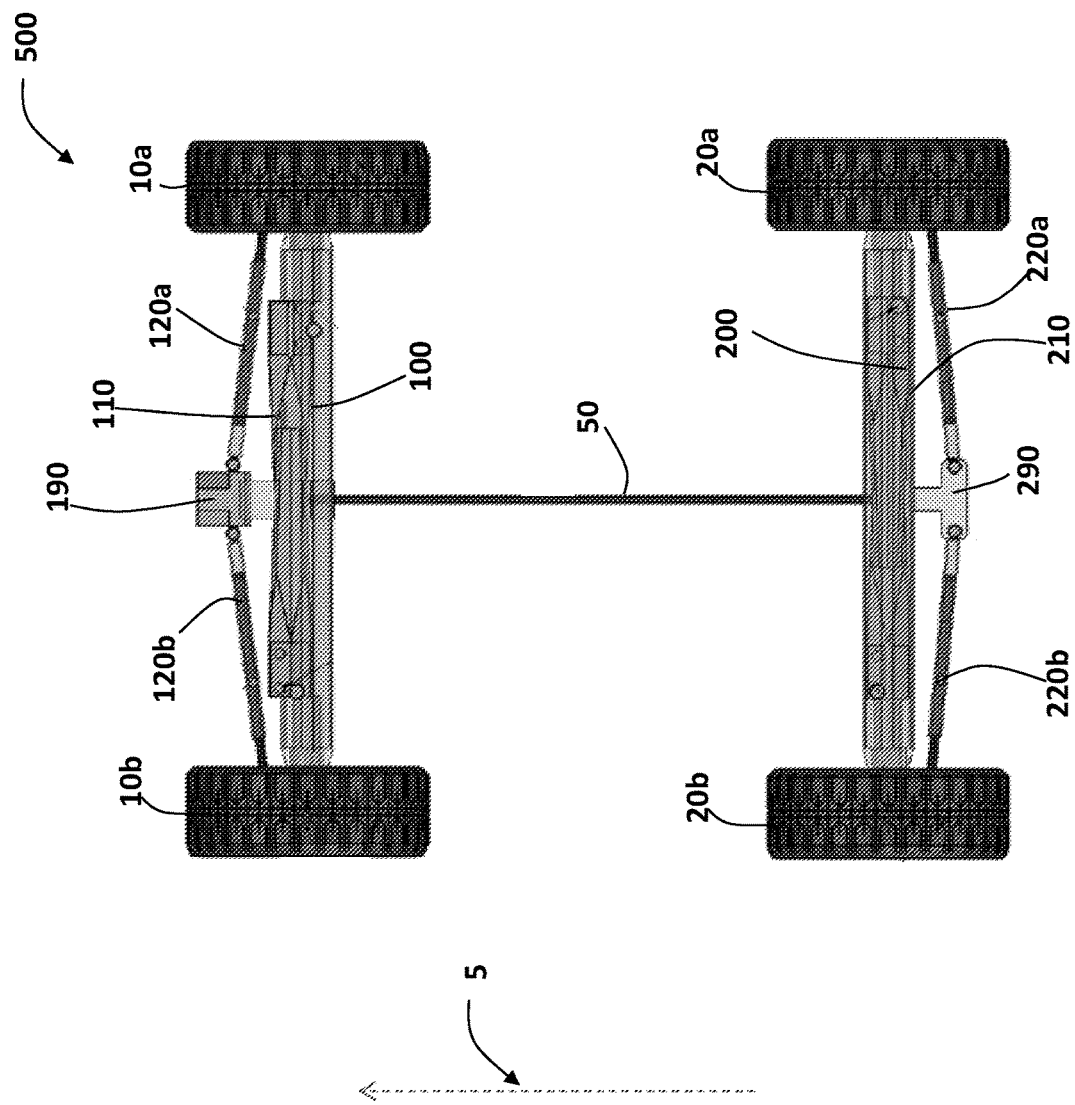
Figure 7C:
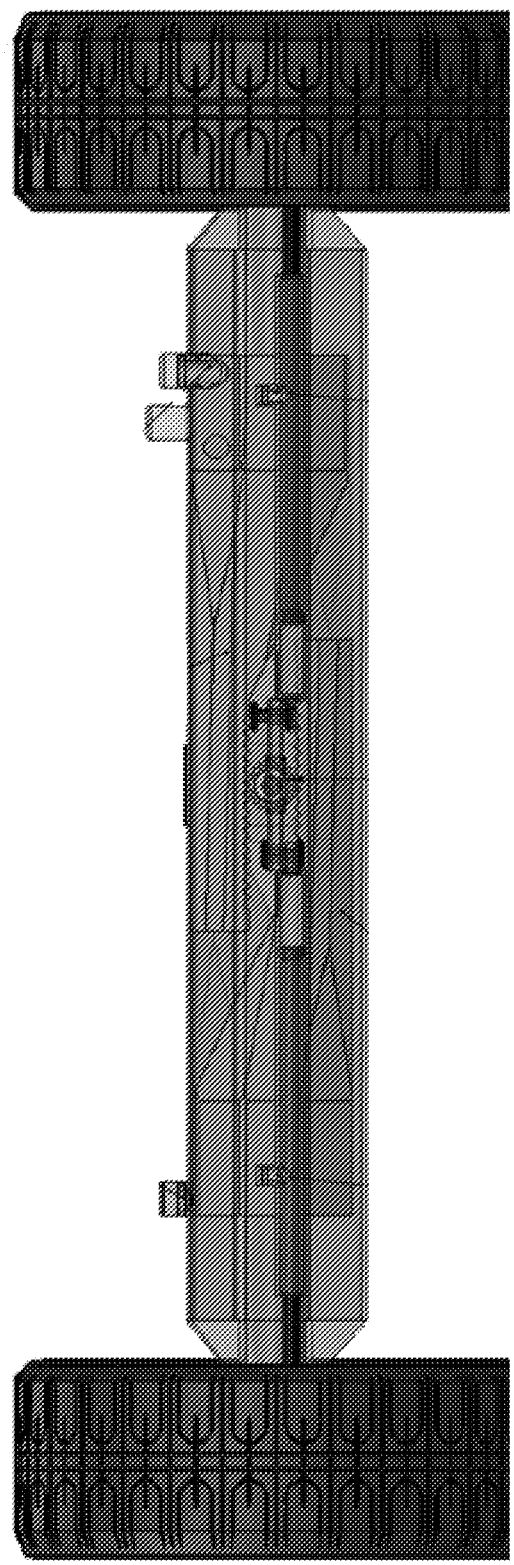

FIGS. 4A-7C shows the system 500 in several positions. FIGS. 4A-4C show the system 500 in a converged and folded position in respect to a forward driving direction, in which the rear and front wheels 10a-20b of the vehicle are in a convergence titling positioning and the system 500 is in its maximal folded position, having its safety stoppers unlocked. FIGS. 5A-5C show the system 500 in a converged and unfolded position, in which the rear and front wheels 10a-20b of the vehicle are in a convergence titling positioning and the system 500 is still in an unfolded position ready for folding thereof, having its safety stoppers unlocked. FIGS. 6A-6C show the system 500 in a non-converged and unfolded position, in which the rear and front wheels 10a-20b of the vehicle are in a non-convergence titling positioning and the system 500 is still in an unfolded position ready for driving or after unfolding thereof, having its safety stoppers locked. FIGS. 7A-7C show the system 500 in a non-converged and folded position, in which the rear and front wheels 10a-20b of the vehicle are in a non-convergence titling positioning and the system 500 is still in a folded position ready for parking or after folding thereof, having its safety stoppers locked.

The maximal width of the vehicle may be set according to standards and regulations of the specific geographical area as well as according to the design of the specific vehicle. In this example, the maximal width of the vehicle in the fully unfolded position is set to 1.60 meters (see FIG. 6C) and the minimal width in the folded position is set to 1.00 meter (see FIG. 7C). In other embodiments the minimum width may be set to 1.60 meters while the maximum width may be set to 2.20 meters in countries that only allow minimal four-wheel vehicle width of 1.60 meters.

In these embodiments the system 500 only allows locking onto two optional positions setting two optional vehicle's widths: a maximal one and a minimal one. However, in other embodiments the safety stoppers may fit into other additional recesses, for instance, for allowing one or more middle widths of the vehicle.

As illustrated in FIGS. 1, 4A-4B, 5A-5B 6A-6B and 7A-7B, the two adjustment assemblies 100 and 200 are connected to one another for coordinating their operations by having a drive shaft 50 connecting the two gears 150 and corresponding gear of the rear wheels (not shown) of the foldable units 110 and 210 of the two adjustment assemblies 100 and 200. The controller 300 also coordinates its operation of the telescopic members 120a-120b and 220a-220b of the tilting units 120 and 220 to ensure simultaneous and coordinated folding and unfolding of the adjustment assemblies 100 and 200.

In other embodiments other mechanism can be applied to coordinate the adjustment assemblies such as hydraulic/pneumatic systems for controlling the pistons or a single electric motor and the like.

According to some embodiments, as illustrated in FIG. 1, since many countries regulations for a four-wheel vehicles require that the sides of the vehicles between the wheels will be walled, walls 11 and 12 (further shown in FIGS. 13A 13B) may be installed such that they can move along with the wheels 10*a*-20*b* when having the distance therebetween adjusted, for example, by directly or indirectly connecting to the center of the wheels 10*a*-10*b* and 20*a*-20*b*.

According to some embodiments, the system 500 is configured for being embedded in any vehicle type such as in an electric vehicle or non-electric one having an engine, for enabling width adjustment thereof, wherein the controller 300 may be powered via the battery of the vehicle or any other energy source.

According to some embodiments, the system 500 requires no chassis to the vehicle, depending of course on the overall weight that can be achieved, which depends mainly on the weight and size of the passengers' compartment and engine/battery weight to be installed thereover.

According to some embodiments, the system 500 also includes means for limiting the steering angle (i.e. the angle of the steering wheels) during the folding and unfolding drive sessions for preventing the driver from diverting the steering wheel of the vehicle too sharply. The folding process is performed automatically not requiring the driver intervention, the driver may just stop the process in case of emergency.

According to some embodiments of the invention, the controller 300 includes one or more computerized programmable control boxes that may control other mechanical elements for controlling the pistons of the telescopic elements of the tilting unit and also for controlling the locking and unlocking or releasing of the safety stoppers, for controlling the steering angle and the driving speed during folding and unfolding of the vehicle. The controller 300, as mentioned above, may be powered via the battery of the vehicle.

In some embodiments the width adjustment of the adjustment units of the system is done by actuating the tilting units thereof while the length adjustment of the foldable unit is done automatically during the drive of the vehicle caused by the tilting of the wheels in respect to their "Y" axis connecting their centers. However, in other embodiments the foldable units are the ones actuated (e.g. by having a motor rotating the drive shaft connecting the gears thereof) while the tilting is done automatically due to the off-center connection of the telescopic members to the wheels or by any other means. In yet other embodiments of the invention, both the tilting units and the foldable units are actuated simultaneously via the controller using different or the same actuators for actuating each type of unit. For example, one actuator such as a drive motor may be used for rotating the drive shaft connecting the foldable units' gears, while another actuator motor can be used for tilting the wheels by pulling and pushing the pistons in and out of their corresponding cylinders. In any case, however the vehicle has to be driven in a low non-zero speed during actuation.

Figure 8:
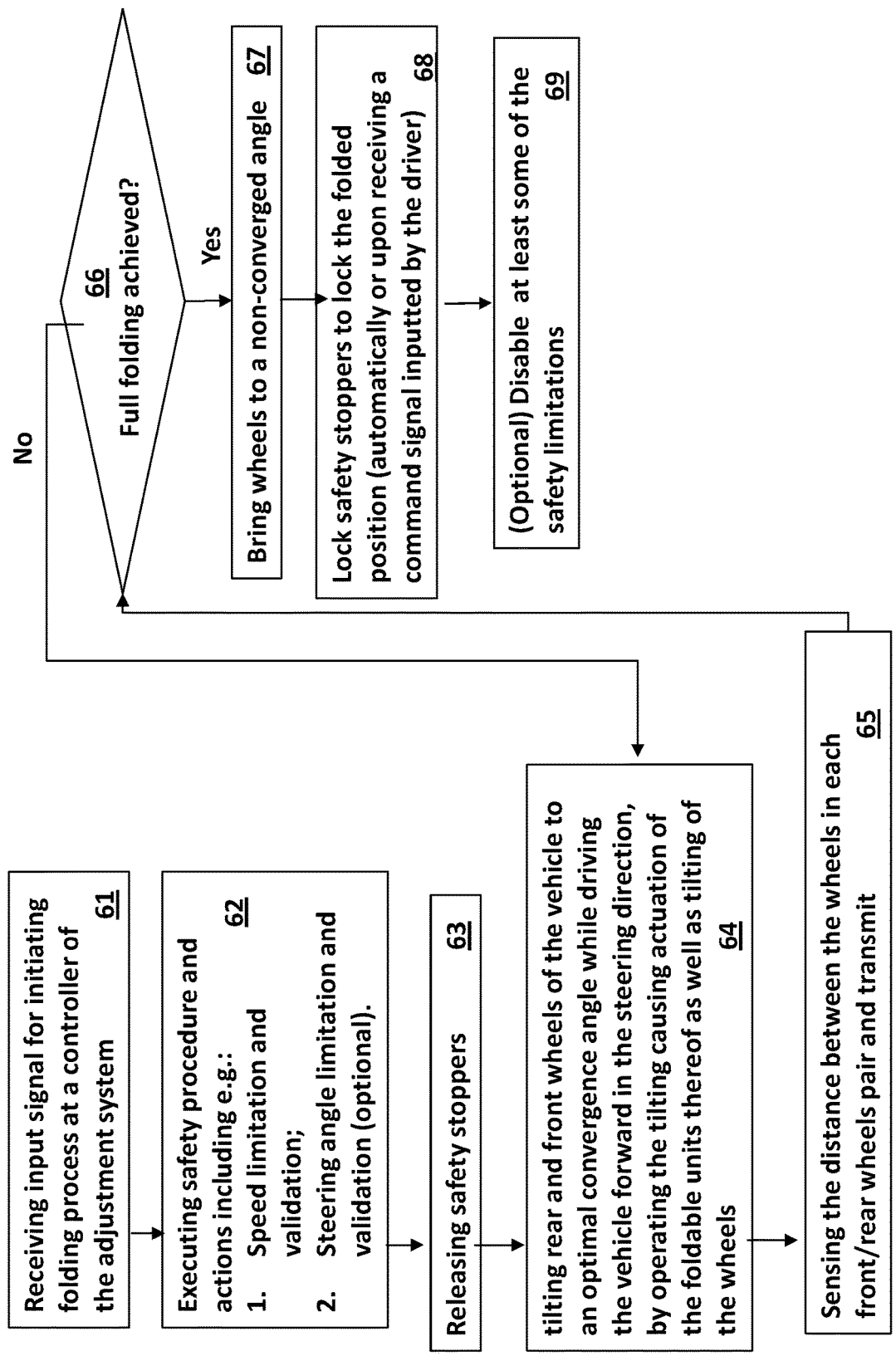
FIG. 8 is a flowchart, schematically illustrating a process of folding/constricting a foldable vehicle, according to some embodiments of the invention.

Reference is now made to FIG. 8, which is a flowchart schematically illustrating a process for folding a foldable vehicle having several adjustment assemblies as described above or in other configurations, according to some embodiments of the invention. The folding process includes first receiving an input signal at the controller of the system initiated by the driver or another user for initiating a folding drive session 61, e.g. by having the driver pressing a folding/unfolding real or virtual button at an interface operatively associated with the controller. Once the controller receives this signal 61 it automatically executes a safety and initiation procedure 62 including at least one of the following steps: (i) speed limit validation and control, in which the controller (which may be associated with the power supply system of the vehicle) ensures that the vehicle is driven within a predefined range of speeds either by taking control over the power supply of the vehicle or by instructing the driver via the interface; and optionally (ii) steering angle limit validation and control, in which the controller (which may also be associated with the steering wheel system of the vehicle) ensures that the steering wheel angle does not exceed a predefined limit. Once the safety procedure is done and verified, the safety stoppers or any other locking mechanism that prevents folding of the vehicle are released 63 and the controller begins a coordinated tilting of the vehicles pairs of wheels 64 before or during the slow driving of the vehicle in a forward or backward direction causing thereby the pairs of wheels to have their front wheels converge when in a forward drive and diverge when in a backward drive, which will cause the foldable unit to fold and the distance between each pair of wheels to decrease. The distance between the wheels in each pair is optionally sensed 65 in real time via any one or more sensing mechanism such as by sensing the number of rotations done by a drive shaft mechanically connecting the adjustment assemblies of the system and/or by sensors located at the foldable unit's adjustment members and the like. Optionally the wheels are tilted before locking the safety stoppers when the vehicle is not in motion.

The sensed information is received and processed at the controller or another computerized unit of the system and once a full folded position of the vehicle is identified 66 and the wheels are tilted back to a non-converged angular positioning 67 such as to an angle in which the wheels are parallel to the forward driving direction, and then the safety stoppers are locked 68. The safety limitations such as the speed and steering angle limitations may be disabled 69 to allow free normal drive of the vehicle. Optionally the wheels are tilted before locking the safety stoppers or at the same time.

Figure 9:
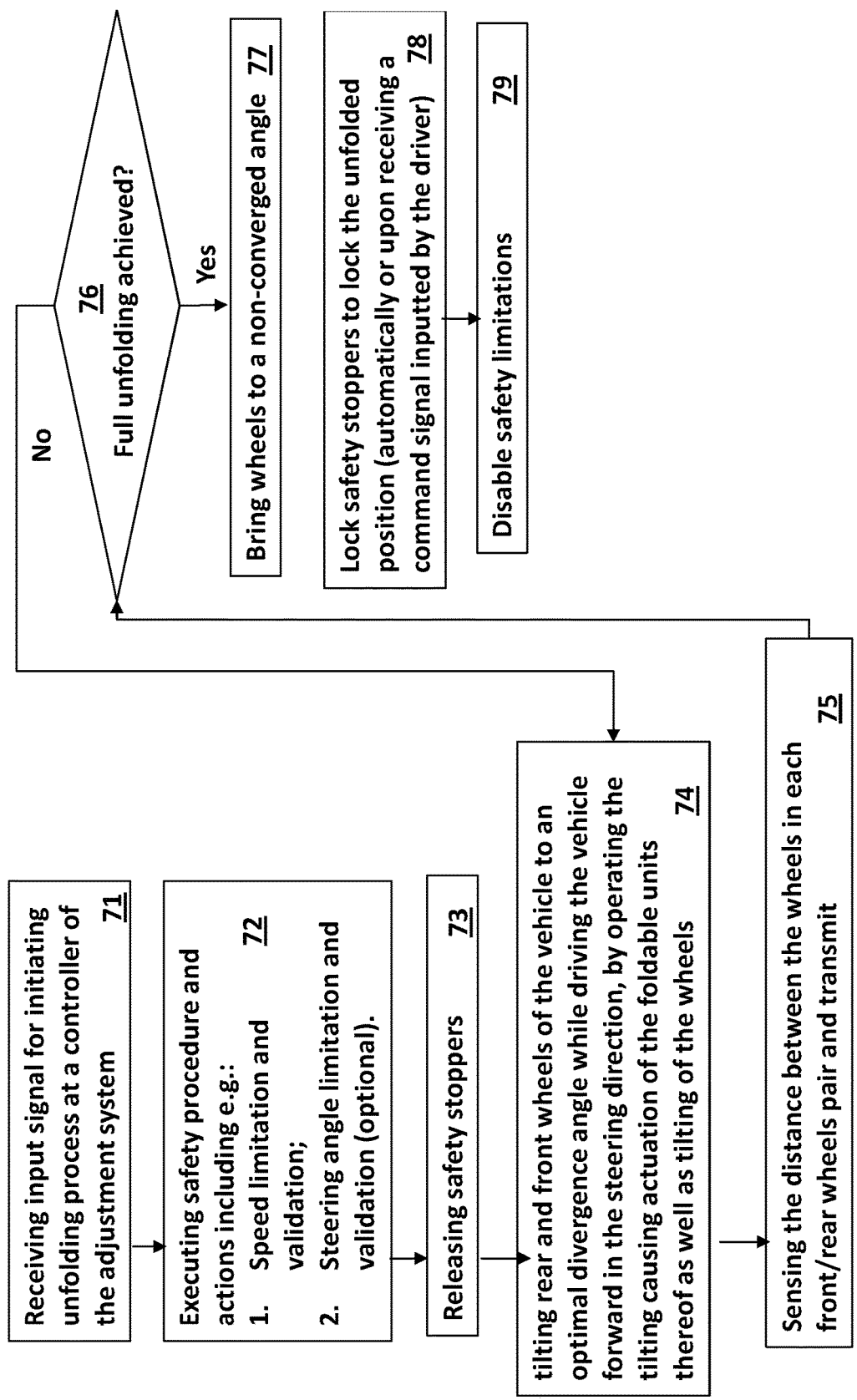
FIG. 9 is a flowchart, schematically illustrating a process of unfolding/extending a foldable vehicle, according to some embodiments of the invention.

According to some embodiments, the unfolding process illustrated in FIG. 9, the unfolding process may include first receiving an input signal at the controller of the system initiated by the driver or another user for initiating an unfolding drive session 71, e.g. by having the driver pressing a folding/unfolding real or virtual button at an interface operatively associated with the controller. Once the controller receives this signal 71 it automatically executes a similar safety and initiation procedure 72 including at least one of the following steps: (i) speed limit validation and control; and optionally (ii) steering angle limit validation and control. Once the safety procedure is done and verified, the safety stoppers or any other locking mechanism that prevents unfolding of the vehicle are released 73 and the controller begins a coordinated tilting of the vehicles pairs of wheels 74 before or during the slow driving of the vehicle in a forward or backward direction causing thereby the pairs of wheels to have their front side diverge when in a forward drive and converge when in a backward drive, which will cause the foldable unit to unfold and the distance between each pair of wheels to increase. The distance between the wheels in each pair is optionally sensed 75 in real time in the same manner as it is sensed in the folding process. The sensed information is received and processed at the controller or another computerized unit of the system and once a full unfolded position of the vehicle is identified 76 the wheels are tilted back to a non-converged angular positioning 77 such as to an angle in which the wheels are parallel to the forward driving direction, and then the safety stoppers are locked 78. The safety limitations such as the speed and steering angle limitations may be disabled 79 to allow free normal drive of the vehicle.

Figure 10A:
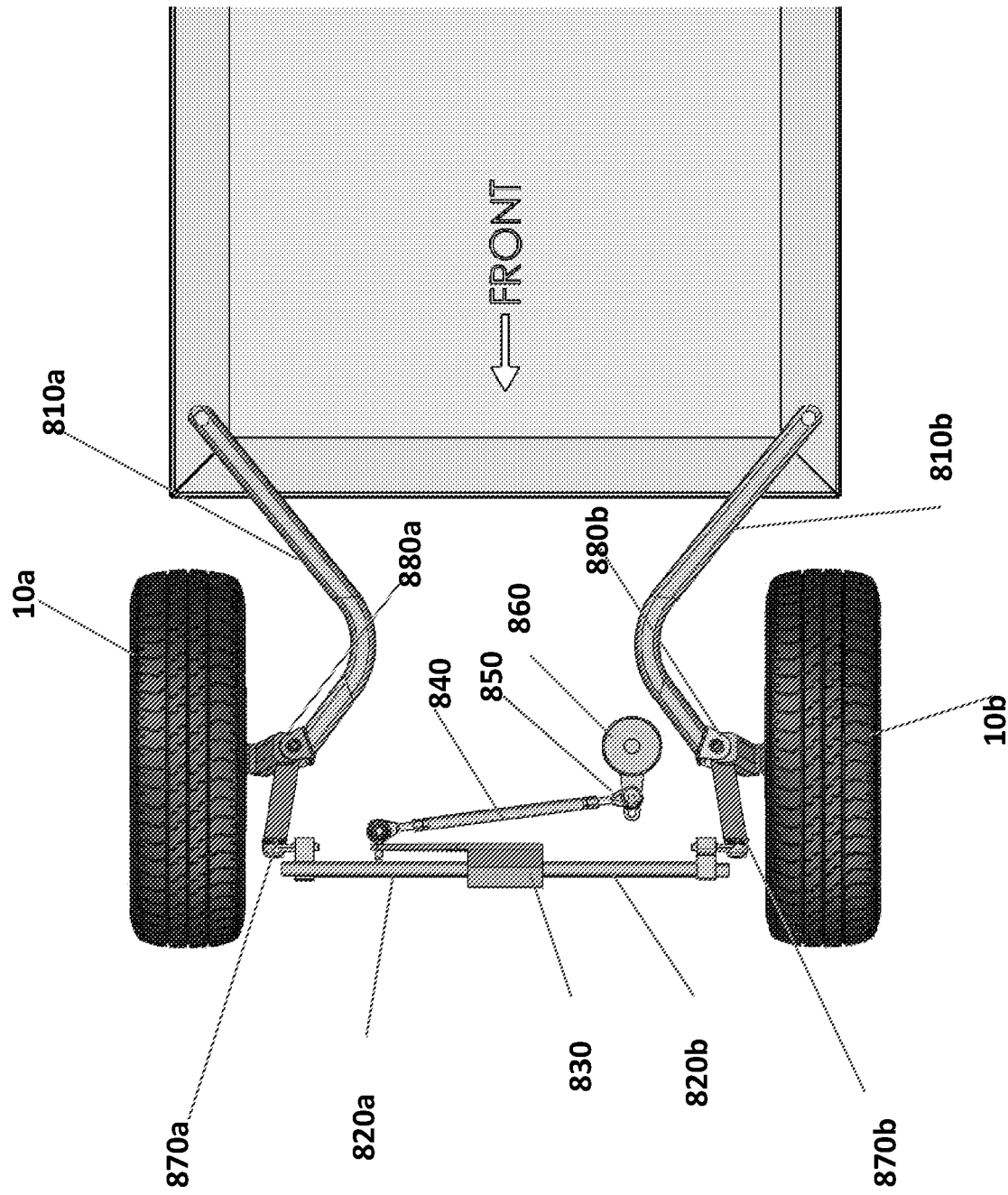

FIGS. 10A-10B show an optional configuration of the system folding/extending mechanism, according to some embodiments of the invention: FIG. 10A shows top view of folding/extending mechanism in folded position; FIG. 10B shows a top view of folding/extending mechanism in the unfolded position. The folding/extending mechanism according to this embodiment is comprised of two arms 810A, 810B rotatabley connected one side to the vehicle front edge and on the other side to the front wheels, 10a, 10b, via hinges 880A,B. The hinges are also connected to bar 870a,b which connects an extendable rods assembly 820a,b. The extendable rods assembly 820a,b is optionally driven by motor 860 through piston 850. The principle operation of the folding/extending mechanism is equivalent to the first solution in FIGS. 1-7, the wheels are tilted by motor driven tilting mechanism or engine as described in the first solution, (not shown in these figures) causing by friction force, all the extendable/folding parts to move laterally in opposite directions away from or towards each other for respectively increasing or reducing the distance between each pair of wheels 10a-10b.

Figure 11A:
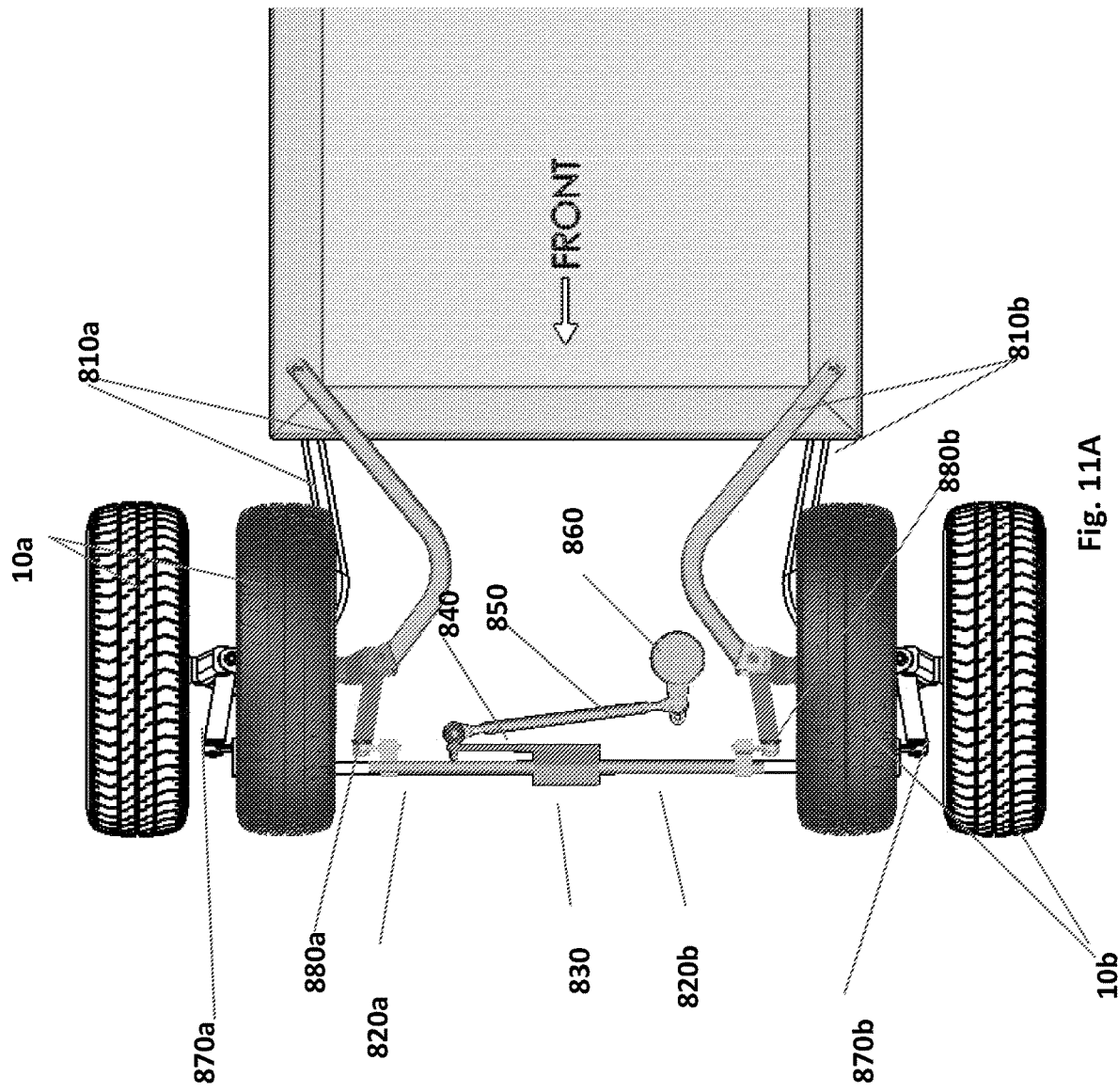

FIGS. 11A-11B show the alternative configuration of the system folding/extending mechanism at different tilting positions, according to some embodiments of the invention: FIG. 11A shows top view of folding/extending mechanism in folded position and the wheels at strait position.

FIG. 11A shows top view of folding/extending mechanism in folded position and the wheels at tilted position.

Figure 12A:
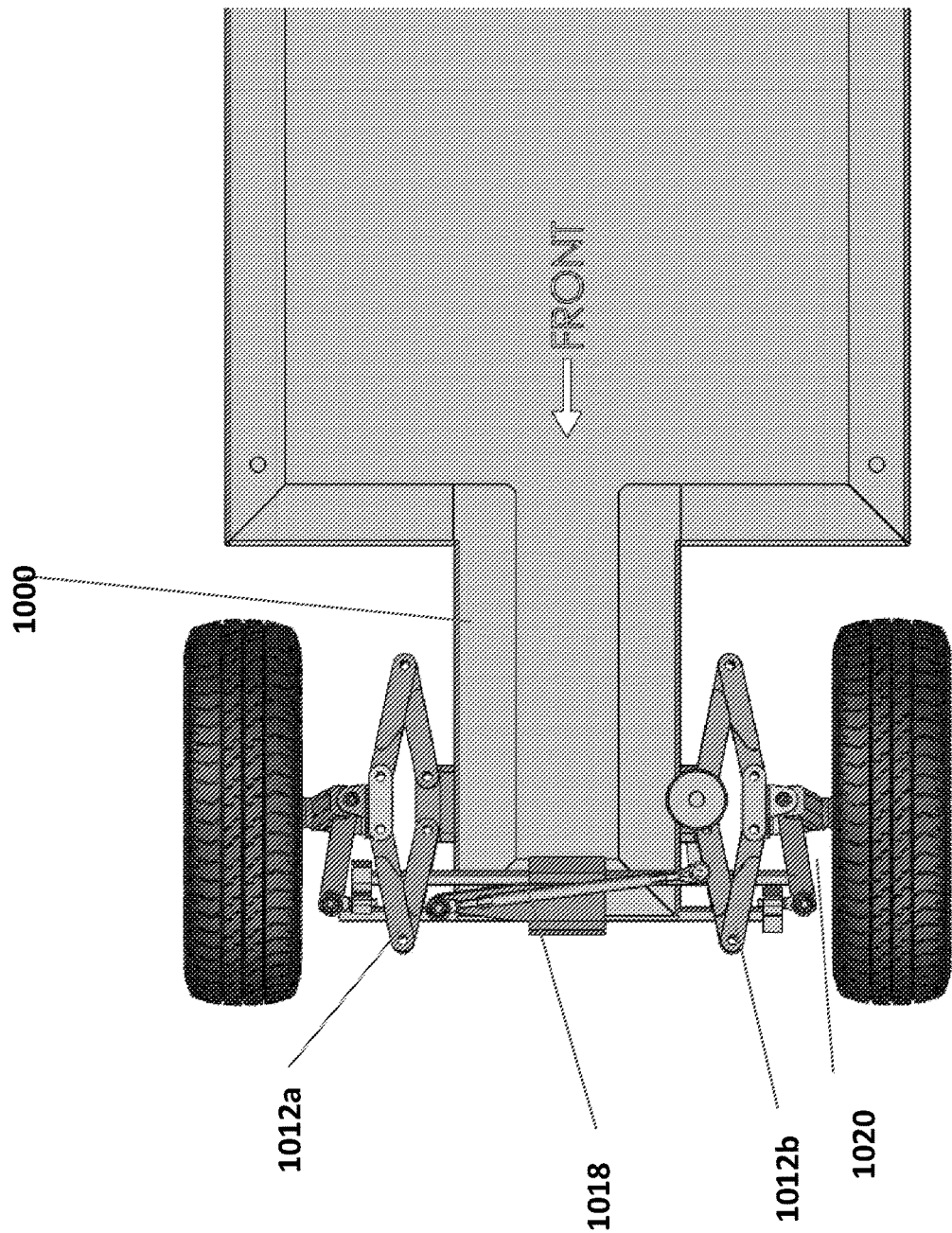

FIGS. 12A-12C show another alternative configuration of the system folding/extending mechanism, according to some embodiments of the invention: FIG. 12A shows top view of folding/extending mechanism in folded position; FIG. 12B shows a top view of folding/extending mechanism in the unfolded position FIG. 12C shows a top view of folding/extending mechanism in different folding position—folded and unfolded positions The folding/extending mechanism according to this embodiment is comprised of two pentagon folding assemblies 1012a,b connected on one end to the edge of the vehicle front 1000 and on the end side to the front wheels, 10a, 10b, via hinges. The hinges are also connected to bars 1020a, 1020b, which are rotatably interconnected by bar 1018. Through the folding process, the pentagon folding assemblies are folded as seen in FIG. 12A and the bars 1020a, 1020b move laterally in opposite directions away from or towards each other for respectively increasing or reducing the distance between each pair of wheels 10a-10b.

The principle operation of the folding/extending mechanism is equivalent to the first solution in FIGS. 1-7, the wheels are tilted by motor driven tilting mechanism or an engine as described in the first solution, (not shown in these figures) causing by friction force all the extendable parts to fold or move laterally in opposite directions away from or towards each other for respectively increasing or reducing the distance between each pair of wheels 10a-10b.

Figure 13A:
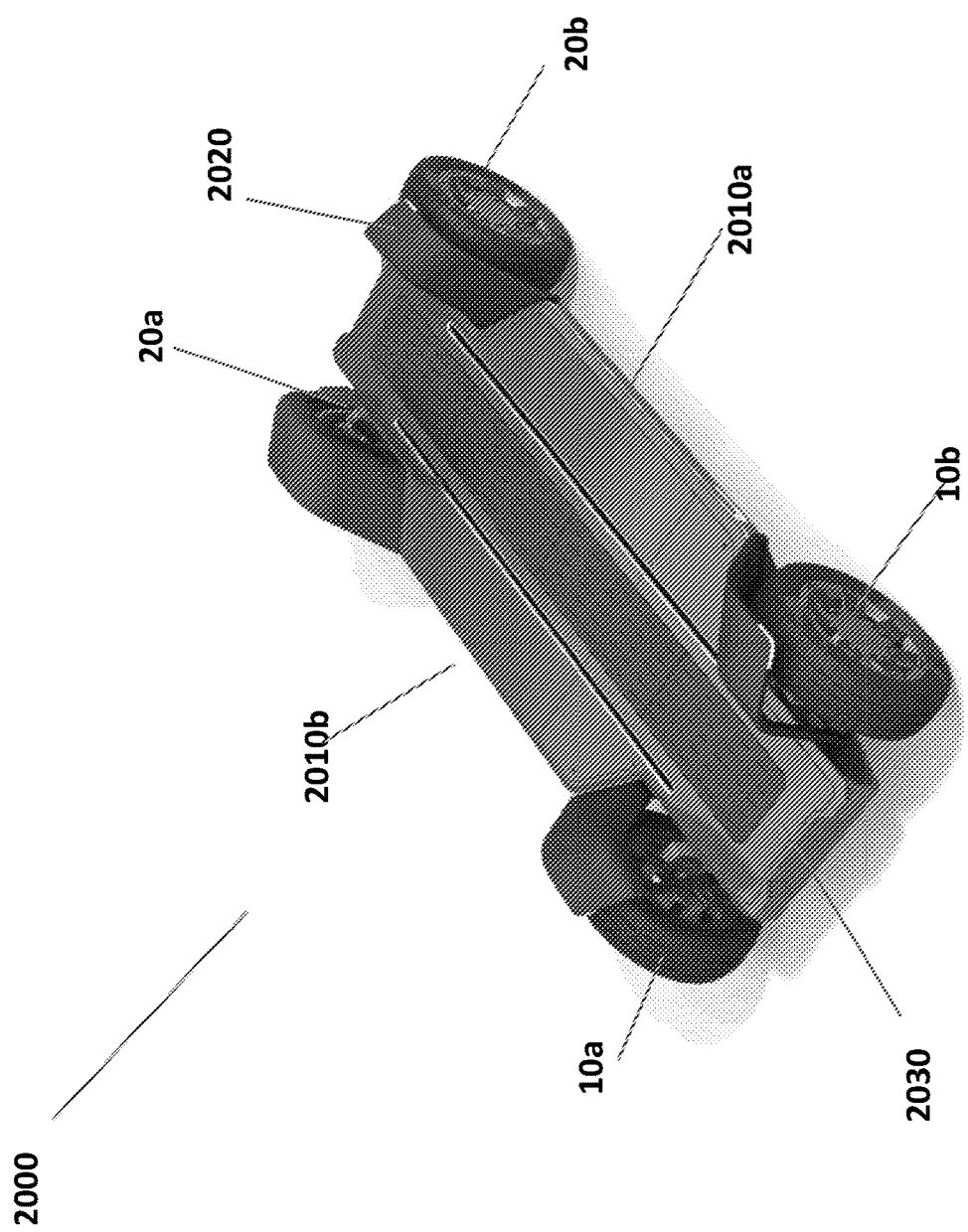
FIGS. 13A-13B show configuration of the system bottom structure in the different folding position, according to some embodiments of the invention.
Figure 13B:
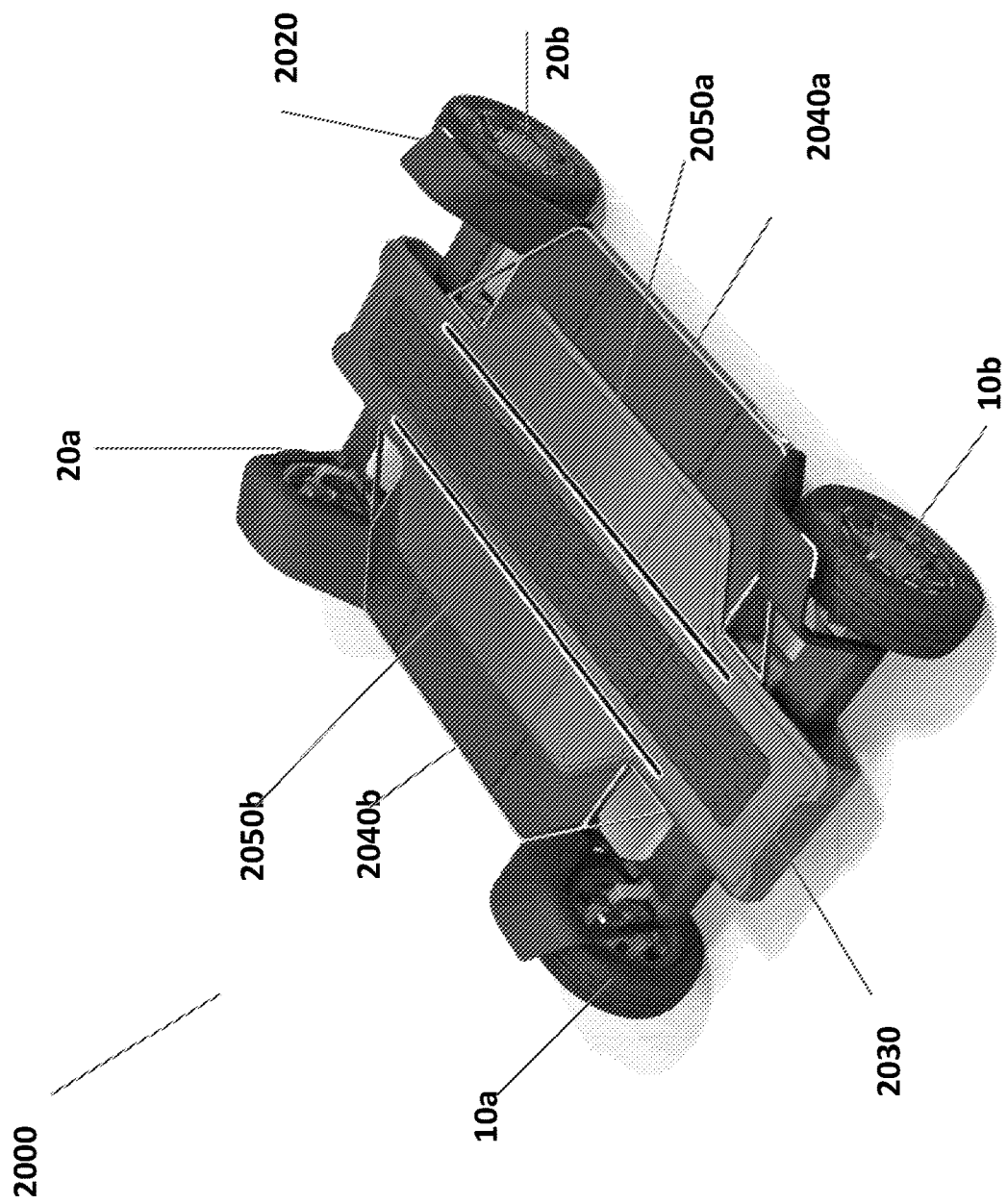

FIGS. 13A-13B show configuration of the system bottom structure in the different folding position, according to some embodiments of the invention: FIG. 13A shows top view of the system bottom structure in folded position; FIG. 13B shows a top view of the system bottom structure in the unfolded position.

According to this embodiment, the folding/extending mechanism, is further applied on safety bottom platforms 2010,a,b, which fold and unfold along with the wheels, 10a,b, and 20 a, b Each safety bottom platforms is comprised of two surfaces fixed surfaces 2050 a, b and movable surfaces 2040 a, b which are slidable one above the other, constructing foldable platform. Optionally are integrated wheels covers 2020, which move as one part with the surfaces.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A vehicle comprising:
   at least one adjustment assembly connectable to at least one pair of wheels of the vehicle, said at least one adjustment assembly comprising:
   a) at least one tilting unit configured to change the angular position of the wheels of said pair of wheels with respect to a horizontal axis extending on a horizontal plane and between the centers of said pair of wheels, wherein the at least one tilting unit is configured to change the angular position of the wheels between a convergence tilting positioning of the wheels and a non-convergence tilting positioning of the wheels;
   b) a foldable unit having at least two portions coinciding with a folding axis extending on said horizontal plane along the horizontal axis, each of the at least two portions being connected to a corresponding wheel of the wheels of said pair of wheels, wherein the at least two portions of the foldable unit are configured to move laterally along the folding axis when the wheels are in the convergence tilting positioning thereof, thereby changing the distance between the wheels of said pair of wheels; and
   c) at least one safety stopper configured for switching the foldable unit between a locked position, in which the lateral movement of the at least two portions of the foldable unit along the folding axis is prevented, and an unlocked position, in which the lateral movement of the at least two portions of the foldable unit along the folding axis is allowed; and
   a controller configured for:
   controlling the at least one tilting unit to change the angular position of the wheels between the convergence tilting positioning of the wheels and the non-convergence tilting positioning of the wheels; and
   controlling the at least one safety stopper for switching the foldable unit into the unlocked position when the wheels are in the convergence tilting positioning, and into the locked position when the wheels are in the non-convergence tilting positioning.

2. The vehicle of claim 1, wherein the change in the angular position of all wheels is synchronized.

3. The vehicle of claim 2, wherein the change in angular position is equal and opposite in the two wheels of the pair.

4. The vehicle of claim 1, wherein the foldable unit includes adjustment members having serrated portion and sloped portion, wherein the adjustment members are engaged at the serrated portion by a gear, such that when the wheels are in the convergence tilting positioning and the vehicle is driven, the gear rotate and transmit torque thereof for causing lateral departing or converging of the adjustment members; the movement of the adjustment members being optionally restricted via the at least one safety stopper; and the gear optionally comprises a sensor for indicating the width of said at least one adjustment assembly.

5. The vehicle of claim 1, wherein the foldable unit comprises a telescopic element or a pentagon collapsing assembly.

6. The vehicle of claim 1, the at least one adjustment assembly further comprising bottom platforms which are folding and unfolding correspondingly to the change in distance between the wheels.

7. The vehicle of claim 1, wherein the tilting unit is associated with a motor configured for changing the angular position of the wheels.

8. The vehicle of claim 1, wherein the foldable unit is associated with a motor configured for changing said distance between the wheels.

9. The vehicle of claim 1, wherein the tilting unit includes two telescopic members each including a piston, coaxially inserted and movable in cylinders.

10. The vehicle of claim 1, wherein both the tilting unit and the foldable unit are simultaneously actuated.

11. The vehicle of claim 1, the at least one adjustment assembly further comprising sensing means for measuring distance between the wheels.

12. The vehicle of claim 1, wherein the angular position of the wheels is changed gradually while the distance between the wheels is being changed.

13. The vehicle of claim 1, wherein the controller is configured for controlling at least one of:
   (i) the tilting unit;
   (i) the foldable unit;
   (ii) the execution of a safety procedure of predefined rules, before activating the at least one adjustment assembly, the rules including at least one of the following: (i) speed limit validation and control, and (ii) steering angle limit validation and control.

14. The vehicle of claim 1, comprising two adjustment assemblies each connectable to a different pair of wheels, wherein the two foldable units are coupled to and jointly operate with one another.

15. The vehicle of claim 1, wherein the controller is configured for controlling the tilting unit to change the angular position of the wheels to tilt the wheels into the convergence tilting positioning thereof when the distance between the wheels is to be changed, and for controlling the tilting unit to change the angular position of the wheels to tilt the wheels into the non-convergence tilting positioning thereof when the distance between the wheels is to be kept constant for normal driving of the vehicle.

* * * * *